(12) United States Patent
Mukhopadhyay

(10) Patent No.: US 10,909,372 B2
(45) Date of Patent: Feb. 2, 2021

(54) ASSISTIVE DEVICE FOR THE VISUALLY-IMPAIRED

(71) Applicant: MICROSOFT TECHNOLOGY LICENSING, LLC, Redmond, WA (US)

(72) Inventor: Debasish Mukhopadhyay, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 106 days.

(21) Appl. No.: 15/990,746

(22) Filed: May 28, 2018

(65) Prior Publication Data

US 2019/0362149 A1   Nov. 28, 2019

(51) Int. Cl.
| G09B 21/04 | (2006.01) |
| G06T 7/70 | (2017.01) |
| G06T 7/73 | (2017.01) |
| G06K 9/62 | (2006.01) |
| G06K 9/00 | (2006.01) |
| G06F 3/16 | (2006.01) |
| H04N 5/247 | (2006.01) |

(52) U.S. Cl.
CPC ......... *G06K 9/00671* (2013.01); *G06F 3/16* (2013.01); *G06K 9/00288* (2013.01); *G06K 9/6267* (2013.01); *G06T 7/74* (2017.01); *G06T 2207/30224* (2013.01); *G06T 2207/30241* (2013.01); *H04N 5/247* (2013.01)

(58) Field of Classification Search
USPC .................. 381/23.1, 306–311, 26, 59, 312; 382/103, 104, 224, 285–291; 396/6–10, 396/20, 25–30, 57–59, 65, 89, 153, 396/297–300, 322, 360, 429–434
See application file for complete search history.

(56) References Cited

U.S. PATENT DOCUMENTS 8,437,506 B2* 5/2013 Williams ................ G06F 3/011
382/103
8,588,464 B2   11/2013 Albertson et al.
2005/0208457 A1   9/2005 Fink et al.
(Continued)

FOREIGN PATENT DOCUMENTS

CN   101040810 A   9/2007
WO   2016086440 A1   6/2016

OTHER PUBLICATIONS

Guerrero, et al., "An Indoor Navigation System for the Visually Impaired", In Journal of Sensors, vol. 12, Jun. 13, 2012, pp. 8236-8258.
(Continued)

*Primary Examiner* — Marcellus J Augustin
(74) *Attorney, Agent, or Firm* — NovoTechIP International PLLC

(57) ABSTRACT

Devices, systems, and methods for providing auditory sensory substitution using an assistive device are disclosed. Objects in the real-world are observed by a depth camera and classified. The classification is used to identify a sound corresponding to the object. In some cases, the position of the object can also be used to identify the sound. The device is configured to permit vision-impaired players to participate in athletic events.

20 Claims, 16 Drawing Sheets

(56) References Cited

U.S. PATENT DOCUMENTS

| | | | |
|---|---|---|---|
| 2011/0092249 A1* | 4/2011 | Evanitsky | H04M 1/72594 |
| | | | 455/556.1 |
| 2012/0080523 A1* | 4/2012 | D'urso | A61F 9/08 |
| | | | 235/404 |
| 2012/0252608 A1* | 10/2012 | Calzolari | A63B 69/0013 |
| | | | 473/499 |
| 2012/0268563 A1* | 10/2012 | Chou | A61H 3/061 |
| | | | 348/46 |
| 2014/0267642 A1 | 9/2014 | Wexler et al. | |
| 2016/0037137 A1 | 2/2016 | Seiflein | |
| 2016/0225287 A1 | 8/2016 | Djugash | |
| 2016/0260309 A1* | 9/2016 | Dayal | G08B 21/0446 |
| 2017/0151484 A1 | 6/2017 | Reilly et al. | |
| 2018/0225517 A1* | 8/2018 | Holzer | G06K 9/22 |
| 2018/0293755 A1* | 10/2018 | Ahuja | G06T 7/251 |
| 2018/0368780 A1* | 12/2018 | Bruno | G08B 21/0423 |
| 2019/0070064 A1* | 3/2019 | Hogle | A61F 9/08 |
| 2019/0307632 A1* | 10/2019 | Yashiro | G06K 9/6211 |
| 2019/0347956 A1* | 11/2019 | Daga | G16H 40/67 |

OTHER PUBLICATIONS

Kaur, Kalwinder, "Vehicle Crash Sensors: Obstacle Detector", Retrieved From https://www.azosensors.com/article.aspx?ArticleID=197, Aug. 29, 2013, 5 Pages.

Meijer, Peter B.L., "Stereoscopic Vision for the Blind", Retrieved From https://www.seeingwithsound.com/binocular.htm, Retrieved on: Mar. 28, 2018, 7 Pages.

Statt, Nick, "Microsoft revamps its navigation headphones for the blind", Retrieved From https://www.theverge.com/2015/11/30/9821512/microsoft-updates-navigation-headset-for-the-blind, Nov. 30, 2015, 2 Pages.

Kawai, et al., "A Support System for Visually Impaired Persons to Understand Three-dimensional Visual Information Using Acoustic Interface", In Proceedings of the 16th International Conference on Pattern Recognition, vol. 3-vol. 3, Aug. 11, 2002, pp. 974-977.

"International Search Report and Written Opinion Issued in PCT Application No. PCT/US2019/031928", dated Aug. 29, 2019, 12 Pages.

* cited by examiner

ASSISTIVE DEVICE FOR THE VISUALLY-IMPAIRED

BACKGROUND

An estimated 15 percent of the world's population has a disability. In many settings, people with disabilities are marginalized from the socio-economic activities of their communities. People with disabilities are also thought to be less likely to participate in sport, recreation and leisure activities than people without disability.

The concept of sport or athletic competition has been recognized as having unique attributes that can contribute to the community development process and increase social inclusion. Participation in sport has been recognized as a fundamental right, but its impact on the lives of people with disabilities may be particularly relevant. People with disabilities taking part in sport report a sense of achievement, improved self-concept and self-esteem, better social skills, as well as increased mobility and independence. While these benefits are similar to people without disabilities, the positive outcomes are thought to be more significant for people with disabilities given their experience of exclusion from other community activities.

Assistive technologies have helped many people to circumvent, mitigate, or eliminate the barriers to major life activities such as athletic competition. Such assistive technology is defined as any item, piece of equipment, or product system, whether acquired commercially or off the shelf, modified or customized, that is used to increase, maintain, or improve the functional capabilities of a person with a disability.

The benefits of assistive technology cross categories of age, disability, and health challenges. From young children to seniors, people may face a range of physical and cognitive limitations. Today, there are thousands of assistive technology products on the market to help people with disabilities with all sorts of needs, from the simple to the sophisticated. However, efforts to increase inclusion in sports for the visually-impaired have been limited. Thus, there remain significant areas for new and improved ideas for assistive technologies that enable visually-impaired individuals the ability to participate in athletic activities in a simple and effective manner.

SUMMARY

An assistive device, in accord with a first aspect of this disclosure, includes a camera including one or more outward facing image sensors configured to capture first image data for a first object included in a physical space observed by the camera, one or more processors, and one or more non-transitory computer readable media. In addition, the one or more non-transitory computer readable media include instructions which, when executed by the one or more processors, cause the one or more processors to automatically classify the first object as being associated with a first object classification based on the captured first image data, automatically identify a first audio signal based at least on the first object being associated with the first object classification, and emit the first audio signal through a speaker included in the assistive device.

A method of presenting audio signals corresponding to objects captured in a field of view of a camera, in accord with a second aspect, includes capturing first image data for a first object included in a physical space observed by the camera, and automatically classifying the first object as being associated with a first object classification based on the captured first image data. The method also includes automatically identifying a first audio signal based at least on the first object being associated with the first object classification, and emitting the first audio signal through a speaker included in the assistive device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
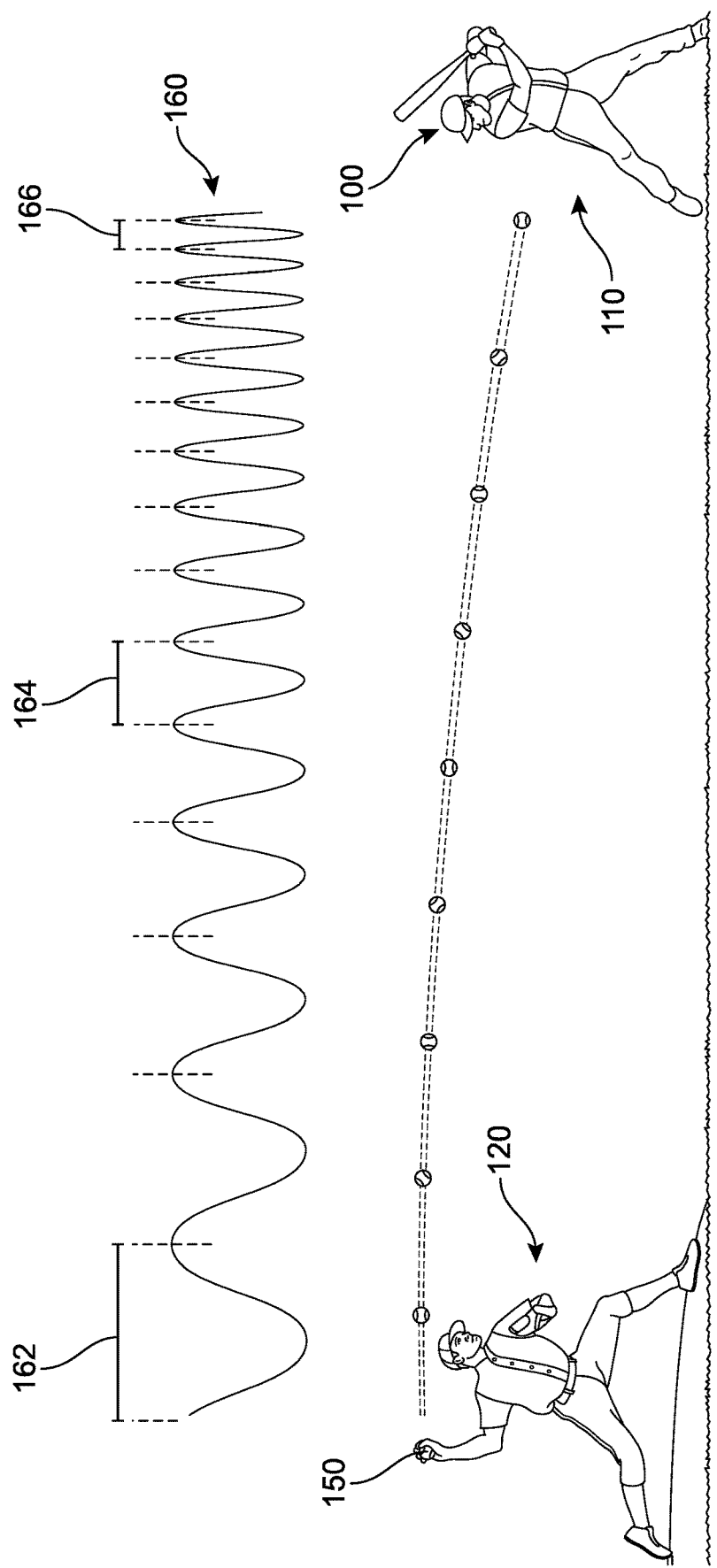
FIG. 1 illustrates an example of a system and method for using an assistive device.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles.

For purposes of this application, the term social inclusion refers to the process of improving the terms on which individuals and groups take part in society—improving the ability, opportunity, and dignity of those disadvantaged on the basis of their identity. One of the most influential internal barriers stem from the attitudes and motivations of people with a disability, particularly self-consciousness and low levels of confidence. Generally, the term "disability" can be understood to describe any physical or mental impairment that substantially limits a major life activity. Disabilities include, but are not limited to, learning disabilities, blindness or low vision, hearing loss, speech impairments, and mobility impairments.

The following description presents various implementations of methods and systems for promoting inclusion of vision-impaired players in athletic activities, with particular attention to baseball and softball. However, it should be understood that some or all of the following implementations may also be readily adapted or utilized in a wide range of athletic activities, such as basketball, football, soccer, bowling, tennis, archery, volleyball, golf, rugby, hockey, and other sports. Furthermore, the systems described herein may be adapted for use across a wide range of applications and industries, including military, education, entertainment, research, and healthcare.

For purposes of this disclosure, various terms associated with blindness, including but not limited to, low vision, blind, legally blind, vision or visual impairment, and other such terms will refer to a diminishment of a person's visual acuity and/or visual field. Individuals are identified as having low vision when they have visual acuity of 20/70 to 20/200 in the better eye after correction (i.e., with eyeglasses or contacts) or a visual field limited to 20-40" after correction. Legal blindness has been defined as visual acuity of less than 20/200 in the better eye after correction or a visual field limited to less than 20". Furthermore, whereas individuals with legal blindness may have some functional residual vision, individuals identified as blind have either no vision or only the ability to perceive the presence of light.

Generally, the term "sensory substitution" as used herein refers to the concept of converting one type of human sensory signal or modality into another modality. For example, a first modality may include visual signals, and a second modality may include audio signals. Other modalities can include haptic-based signals, temperature, vestibulary signals, taste, smell, and other signals that can be perceived by biological sensory organs. Such translation of sensory signals can be used to facilitate the everyday functioning of individuals with some form of sensory loss, notably blindness. The following implementations describe a device configured to apply sensory substitution to enable blind people to process visually derived information by one of their intact senses—in this case, through their sense of hearing. In one implementation, the device is equipped to receive visual images through a camera and convert the data to an audio transmission for the benefit of a user. Thus, the device can serve to translate information from a first sensory modality to a second sensory module and allow a blind player to engage in activities with sighted players.

As a general overview, FIG. 1 presents one implementation of a system and method for sensory substitution in a baseball game in which a first player 110 with a visual disability is batting. A second player 120 (with normal vision) is pitching a ball 150 towards the first player 110. For purposes of illustrating movement of the ball across a distance between the first player 110 and the second player 120, the ball 150 is shown in snapshots as it moves with a dotted line representing the path of the ball over time. In addition, solely for illustrative purposes, a waveform 160 is presented directly above the depicted journey or flight of the ball 150. If the ball itself were producing a sound (such as a beep, whistle, chirp, music, or any other substantially continuous or repetitive sound), the sound would appear to the first player 110 to have an upward shift in frequency as it approaches. This waveform 160 is a representation of one possible shift in frequency of a sound that would be associated with the ball 150 as it moves toward the first player 110, as it might be heard by the first player 110. It can be understood that the human auditory system is generally able to deal with complex and rapidly changing sound patterns, even in a noisy environment or background, and that such shifts would be readily discernable.

It may be observed that the distance between each wave decreases as it approaches the first player. For example, between a first wave and a second wave lies a first distance 162, between a third wave and a fourth wave lies a second distance 164 that is smaller than the first distance 162, and between a fifth wave and a sixth wave lies a third distance 166 that is smaller than the second distance 164. This decrease in distance between each wave is due to the Doppler effect, which is observed whenever a source of sound waves is moving with respect to an observer. Generally, the Doppler effect or Doppler shift can be described as the effect produced by a moving source of waves where there is an apparent upward shift in frequency for observers towards whom the source is approaching and an apparent downward shift in frequency for observers from whom the source is receding. It is important to note that the effect is an apparent change in frequency, and does not result from an actual change in the frequency of the source. Rather, the effect is only observed because the distance between the observer (here, first player 110) and the ball 150 is decreasing.

While the waveform 160 was introduced as a possible representation of an audio-emitting ball, it should be understood that the ball 150 in FIG. 1 is not actually configured to emit audio. Rather, the audio described is being presented to the first player 110 via an assistive device ("device") 100 worn on the head. The device 100 includes a lightweight, wireless, and substantially self-contained system configured to assist vision-impaired players during an athletic game. In some implementations, the device 100 includes a system that is configured to produce sounds that facilitate identification of pitchers, catchers, fielders, bases, and other real-world objects, for example with distinct zonal marking sounds. In one implementation, the device 100 is configured to produce sounds that facilitate identification of the flight of the ball with a broadcast of substantially continuous audio signals. In another implementation, the device 100 is configured to assist the user in identification of players, moods, age, gender, for example, as a response to simple hand gestures. Additional details regarding the components of device 100 will now be presented below with respect to FIGS. 2-4.

Figure 2:
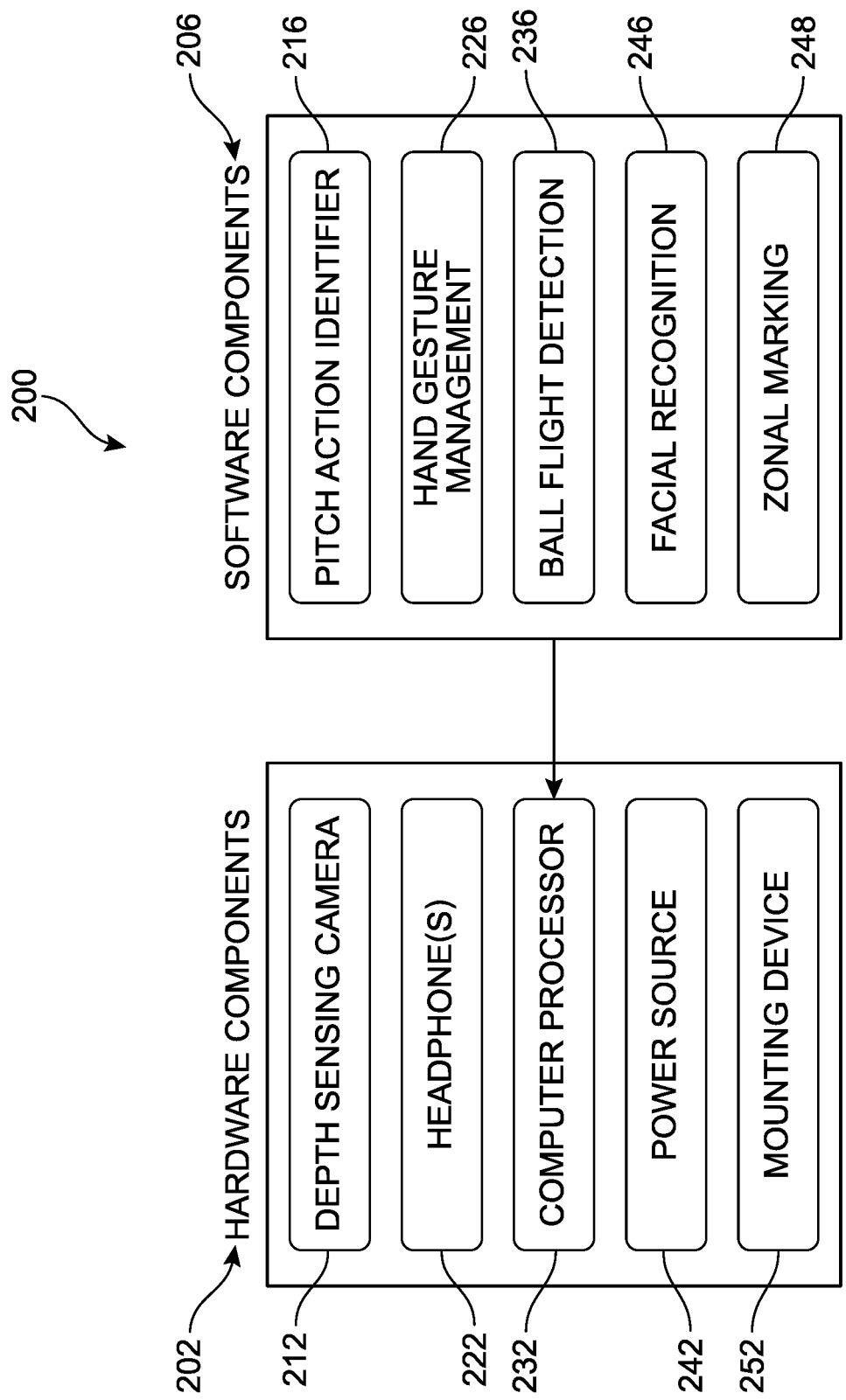
FIG. 2 is a conceptual diagram presenting an implementation of components of an assistive device.

In FIG. 2, an example of a representative architecture of a system 200 for an assistive device is illustrated. In different implementations, the system 200 can be configured to produce, broadcast, generate, emit, or otherwise output sounds associated or correlated with various input received by the system 200. In one implementation, the system 200 includes a plurality of hardware components ("hardware") 202 and software components ("software") 206. As utilized herein, the term "component" refers to any combination of hardware, software, or firmware. The hardware 202 can include a depth-sensing camera ("depth camera") 212, an audio output device such as a small loudspeaker or set of headphones 222, a computer processor ("computer") 232, a power source 242, and a mounting receptacle ("receptacle") 252. In some implementations, each of the depth camera 212, the headphones 222, the computer processor 232, and the power source 242 can be readily removed from receptacle 252 for cleaning, repair, or replacement. In one implementation, the receptacle 252 may be manufactured with specific securing portions and elements, such as pockets, magnets, hook and loop fasteners, screws, elastic, straps, buttons, zippers, or other fasteners that can be loosened or tightened when inserting or removing a component from the receptacle 252.

In different implementations, the depth camera 212 can include various modules that are configured to detect objects, actions, and/or motions in high or low light settings. For example, a depth camera can comprise both software and hardware, including but not limited to an RGB camera, an infrared camera, a depth sensor, and/or a multi-array microphone, as well as associated programming for each module. In one implementation, the camera can be configured to receive information from a depth sensor, a color camera sensor, and/or a microphone array. Furthermore, the depth camera may include one or more outward facing image sensors configured to capture image data for objects in a physical space as observed by the depth camera Additional details regarding some features of the depth camera and computer processor can also be found in U.S. Pat. No. 7,974,443 to Kipman et al., entitled "Visual target tracking using model fitting and exemplar", issued on Jul. 5, 2011; U.S. Pat. No. 8,933,876 to Galor et al., entitled "Three dimensional user interface session control", issued on Jan. 13, 2015; U.S. Patent Publication Number 2014/0300700 to Bamji et al., entitled "Burst-Mode Time-of-Flight Imaging", published on Oct. 9, 2014; U.S. Patent Publication Number 2016/0119611 to Hall et al., entitled "Time-of-Flight Depth Camera Imaging", published on Apr. 28, 2016; U.S. Patent Publication Number 2017/0221212 to Adam et al., entitled "Temporal Time-of-Flight", published on Aug. 3, 2017; U.S. Patent Publication Number 2017/0230551 to Akkaya et al., entitled "Camera with light valve over sensor array", published on Aug. 10, 2017; U.S. Pat. No. 8,267,781 to Geiss et al., entitled "Visual target tracking", issued on Sep. 18, 2012; U.S. Pat. No. 9,039,528 to Geiss et al., entitled "Visual target tracking", issued on May 26, 2015; U.S. Pat. No. 9,052,382 to Bamji et al., entitled "System architecture design for time-of-flight system having reduced differential pixel size, and time-of-flight systems so designed", issued on Jun. 9, 2015; U.S. Patent Publication Number 2011/0291988 to Bamji et al., entitled "Method and system for recognition of user gesture interaction with passive surface video displays", published on Dec. 1, 2011, each of which is herein incorporated by reference in their entirety. As one example, various proprietary versions of the Microsoft Kinect® device can be used, including Kinect 1, 2, and the product line associated with Project Kinect for Azure®. Such devices may permit sensitive and accurate hand tracking capability, high-fidelity spatial mapping, while remaining small, lightweight, and power efficient. In some cases, the camera(s) can be configured to detect substantially small changes, such as a finger movement, facial expressions, and heart rate (see FIG. 14). In one implementation, the camera may include color image resolution of at least 1920×1080 pixels and a Field of View (FOV) of at least 84.1×53.8. Furthermore, the camera may be equipped to provide a depth image resolution of at least 512×424 pixels with an FOV of 70.6×60 degrees.

In some implementations, the depth camera 212 can be configured to provide full-body 3D motion capture, facial recognition, and/or voice recognition capabilities. In addition, the sensor's microphone array can be configured to conduct acoustic source localization and/or ambient noise suppression. In some implementations, the depth sensor includes an infrared laser projector combined with a monochrome CMOS sensor to capture video data in 3D under any ambient light conditions. The sensing range of the depth sensor may be adjustable, and various software can be implemented capable of automatically calibrating the sensor based on gameplay and the player's physical environment, accommodating for the presence of other players, equipment, or other obstacles.

As referenced herein, the term "automatically" or "automatic" are defined as not requiring user intervention, notification, or involvement. Thus, user assistance is not required for the process or task to occur. As another example, the term "automatic" refers to a function, a process, a method, or any part thereof, which is executed by computer software upon occurrence of an event or a condition without intervention by a user.

In different implementations, the software technology is configured to enable advanced gesture recognition, facial recognition, and/or voice recognition. In one implementation, the software may be configured to provide motion analysis with feature extraction. For example, the depth camera can be used to provide or generate skeletal tracking maps, and/or acoustic noise suppression and echo cancellation, beam formation to identify the current sound source, and integration with speech recognition application programming interfaces. As will be discussed further below, machine learning algorithms (MLA) may be implemented to enable the system to effectively detect and identify specific stages of game play.

In different implementations, the audio output can include a pair of small loudspeaker drivers and/or electroacoustic transducers, which can convert electrical signals to a corresponding sound. In one implementation, the system 200 can include high-fidelity noise-cancelling headphones or earphones capable of providing a three-dimensional audio plane or stereo soundscape.

With respect to the computer processor 232, various types of processors may be used that are configured to provide visual cue processing, machine learning (ML) model execution, audio cue generation, and/or cloud services management. For example, any Win IoT device may be used. In some implementations, the processor may include a Raspberry Pi2, Raspberry Pi3, and/or their associated versions. For example, a processor may include a Broadcom® BCM2837 SoC with a 1.2 GHz 64-bit quad-core ARM Cortex-A53 processor, a Broadcom® BCM2837B0 SoC with a 1.4 GHz 64-bit quad-core ARM Cortex-A53 processor, or other Broadcom® processors and/or similar substitutions. Wireless mechanisms such as satellite, wireless networking, Bluetooth®, wifi, Zigbee®, and/or any other means of accessing or communicating data via a wireless network, can also be included with the computer processor 232 or the depth camera 212.

In addition, the power source 242 can generally include any commercial-grade battery pack with sufficient power for operating the depth sensing camera, the headphones, and the processor(s) for extended periods of time. For example, the battery may provide a use-time of at least 6 hours in some cases. The power source may be rechargeable (e.g., via solar energy, electricity, induction, or other charging means) and/or removable. In cases where the battery is solar powered, a solar panel may be included along an outer surface of the helmet. Additional details regarding the solar-powered battery can be found in U.S. Pat. No. 3,844,840 (issued on Oct. 29, 1974 and entitled "Solar Energy Helmet"), and US Patent Publication Number 2011/0231977 (published on Sep. 29, 2011 and entitled "Helmet Cooling Device"), both of which are herein incorporated by reference. In some implementations, the battery is configured to supply power for an extended period of use and then can be replaced. Each of these hardware components can be installed, fitted, affixed, attached, held, integrated, secured, mounted, or otherwise disposed on a housing such as receptacle 252, which will be described in greater detail with respect to FIG. 3.

Referring now to the second section of FIG. 2, it can be seen that in one implementation, the software 206 can include a pitch action identifier component ("pitch identifier") 216, a hand gesture management component 226, a ball flight detection component 236, a facial recognition component 246, and a zonal marking component 248. The pitch identifier 216 can be understood to refer to a set of algorithm(s) and software configured to identify pitching action. For example, the pitch identifier 216 can include a set of ML algorithm(s) and code configured to identify a pitching action and/or generate audio cues. This aspect will be discussed further with respect to FIGS. 5-7.

In some implementations, the hand gesture management component 226 can be configured to detect and identify a plurality of gestures that can be associated with various commands. In one example, at least 8-10 gestures may be available to, for example, adjust audio volume, request face identifications, alter system settings, and other device preferences. Thus, the user (such as the first player 110 in FIG. 1) may be able to exert control of at least some of the system's applications through hand gestures. Additional details regarding some features of the hand gesture management component 226 as used with the system 200 can also be found in U.S. Pat. No. 9,536,135 to Zhang et al., entitled "Dynamic hand gesture recognition using depth data", published on Jan. 3, 2017; and U.S. Patent Publication Number US 2014/0049465 to Tremaine et al., entitled "Gesture operated control for medical information systems", published on Feb. 20, 2014, which are herein incorporated by reference in their entirety.

In some implementations, hand gestures could be used to generate commands associated with continuous one-variable manipulation such as in a plus-minus scheme. For example, a first gesture could indicate a positive increment of one variable (such as an increase in audio volume) while a second gesture could indicate a negative increment of the same variable (such as a decrease in audio volume). Other gestures may be used for other commands such as type of audio, request for facial identification, query regarding the expressions of individuals within a certain field of view, and any other instructions related to the operation and use of the system 200. It should be understood that various ML algorithms and models may be used to detect, identify, and/or classify the various hand gestures.

In different implementations, the ball flight detection component 236 can include a program configured to detect projectile motions towards the user. This component includes the data and training necessary in order to detect the flight of the ball throughout its journey toward the device, and/or away from the device. The ball flight detection component 236 can be understood to refer to a set of algorithm(s) and software configured to identify a baseball (or other type of ball, depending on the sport). For example, the ball flight detection component 236 can include a set of ML algorithm(s) and code configured to identify one or more balls in motion and/or generate audio cues corresponding to the identification of the ball.

In some implementations, the facial recognition component 246 can be configured to detect and identify facial expressions and/or individual faces. For example, the facial recognition component 246 may access locally stored data and/or communicate with a cloud based service to identify different persons. Identifying data such as images and/or time-of-flight data of these persons can be added to a cloud database to permit a blind player to request identification of a pitcher, for example. This can be significant, as one pitcher may have different patterns, habits, and/or abilities that the blind player can take into account when determining when, how, and whether to bat, or otherwise respond.

Similarly, the zonal marking component 248 can be configured to detect and identify borders, regions, or real-world objects that are relevant to the objectives of the use of the system. For example, during a baseball game, the zonal marking component 248 may access local stored data and/or communicate with a cloud based service to identify different zones such as "first base", "second base", "third base", "home base", "outfield", "infield", "foul territory", "dugout", and other such relevant landmarks or reference regions. Identifying data such as images and/or time-of-flight data of these zones can be added to a cloud database to permit a blind player to request identification of a specific field or field type, for example. This can be significant, as one field may have varying arrangements of objects, crowd placement, surrounding structures, or ground texture (e.g., grass, turf, or other ground types) that the blind player can take into account when determining when, how, and whether to bat, or otherwise respond. In some implementations, the substantially unvarying real-world objects themselves may be configured or adapted to communicate wirelessly with the system to increase the accuracy in identification. As one non-limiting example, a base may include an emitter that can transmit a signal to the system 200 and provide information that describes the object's identity and/or location and/or function with greater specificity. This information can then be integrated into the system 200, and the corresponding audio signal being presented to the player may accommodate the relevant information.

In different implementations, the device can also include a training module by which a wearer can learn to use the system and interpret the various sounds, as well as request customize settings or preferences. This training module can be stored locally or can be downloaded from a cloud network. In some implementations, the training module may include multiple sessions that focus on specific aspects of gameplay. In another implementation, a range of training modules may be available, depending on the specific game type that is to be played.

Furthermore, in different implementations, the device can include provisions that allow the system 200 to be easily moved, transported, worn, and carried. In some cases, the device 100 is designed so that the entire system is self-contained and easily transported or moved from its current location. The device is of a weight configured to be moved by a single person. For example, in some implementations, the device may comprise a weight between 0.5-10 lbs. In other embodiments, the device may weigh between 2-6 lbs. The implementations illustrated herein depict the device 100 being incorporated in a receptacle having the form of a head-worn helmet. More specifically, the device 100 can include a structure that can be worn comfortably on the human body for extended periods of time. Furthermore, the device 100 may be water resistant, waterproof, and/or stain-resistant.

Figure 3:
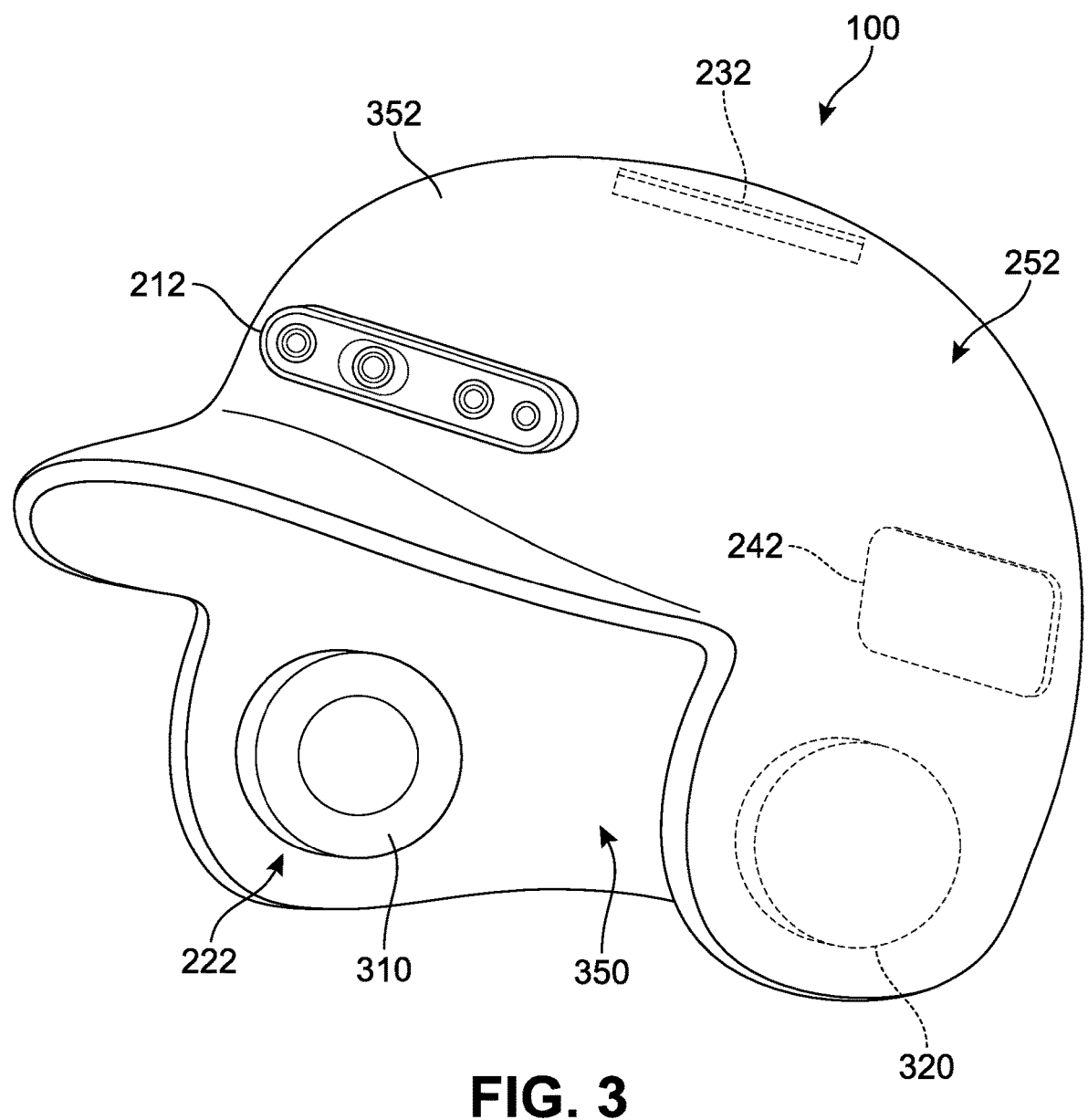
FIG. 3 is an isometric view of an implementation of an assistive device.
Figure 4:
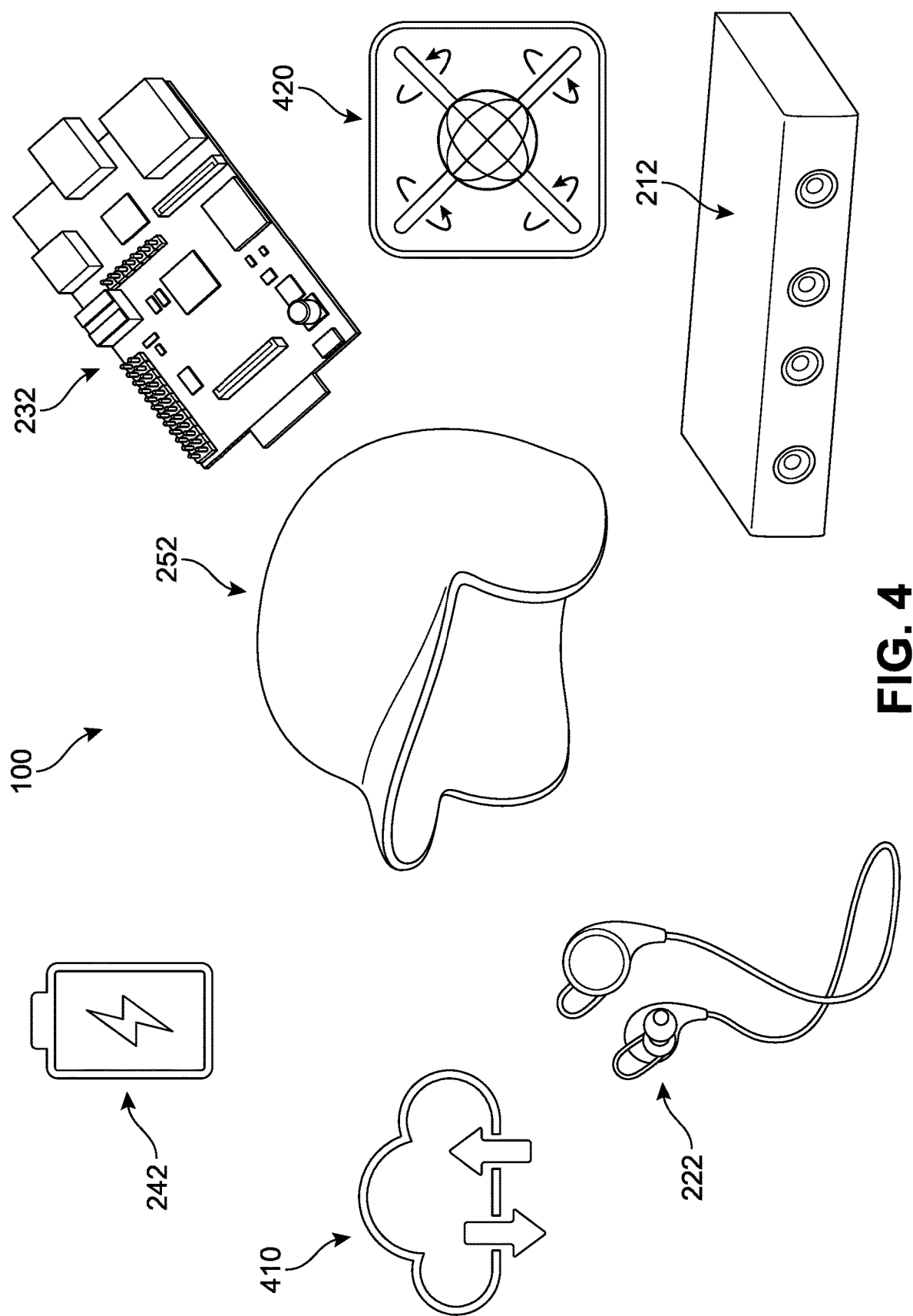
FIG. 4 illustrates some components of an implementation of an assistive device.

Referring now to FIGS. 3 and 4, one implementation of the hardware assembly comprising the assistive device 100 is presented. In FIG. 3, the receptacle 252 is a baseball helmet. In other implementations, the receptacle 252 can include any other head carried or secured apparatus, including but not limited to hard hats, other sport-type helmets, visors, head-strap devices, headbands, and other such platforms. In some other implementations, the assistive device 100 can include a receptacle that may be secured or mounted on another region of a person's body, including the neck, arms, legs, torso, abdomen, forehead, back, rear, and/or chest.

The helmet shown in FIG. 3 includes an interior region 350 and an exterior region 352. In one implementation, components such as the headphones 222 (including a first speaker 310 and a second speaker 320), the power source 242, the computer processor 232, and/or at least a portion of the depth sensing camera 212 can be disposed or secured along the interior region 350. In some implementations, the headphones can be integrated within the housing of the helmet and/or be placed behind an aperture or other acoustically transparent material extending along an inner surface of the helmet. Generally, the position of the headphones will be aligned with the expected dimensions of a person's head and their corresponding ear location. Similarly, in different implementations, the power source 242 can be disposed anywhere along the helmet surface, or can be disposed within the helmet housing itself. In some cases, cushioning may be provided to reduce discomfort that would otherwise occur by direct contact with a component. The depth camera 212 in FIG. 3 is seen as a horizontal bar mounted above the brim of the helmet and extending through an aperture from the interior region 350 onto the exterior region 352. The depth camera is generally positioned such that the direction of the camera is substantially aligned with the estimated gaze of the user when the helmet is worn. Furthermore, in this example, the power source 242, the computer processor 232, and the depth camera 212 are each disposed substantially evenly along a central or midline of the helmet, in order to balance the weight of the components. However, in other implementations, each component can be positioned elsewhere, including along a rear portion, a crown (uppermost) portion, or side portions of the helmet. In some implementations, the various components may communicate or transmit signals wirelessly or via wires integrated within the helmet housing.

In different implementations, the device 100 includes provisions for comfortable and stable use. For example, the device comprising the helmet and associated system can be worn on human heads of different sizes. In some implementations, the curvature and volume associated with a first helmet may correspond generally to the average dimensions of an adult male or female head while the curvature and volume of a second helmet may correspond generally to the average curvature of a child head. The securing mechanism (such as straps, claps, cinching) can include a "universal sizing design" that allows adjustments in the size or fit of the device. However, in other implementations, each device can be customized and built according to the size and proportions of a specific individual, thereby maximizing comfort and wearability. In some other implementations, there may be standard sizes corresponding to gender and common anatomical proportions, such as head circumferences and shape. For example, the device can be made available in an extra-small (XS), small (S), medium (M), large (L), extra-large (XL), double-extra-large (2XL), and so forth. The sizes can be varied based on whether the device is intended for a female or male, or for children.

For purposes of clarity, an exploded view of the device 100 is shown in FIG. 4, including implementations of the receptacle 252, the computer processor 232, the depth camera 212, the power source 242, and the headphones 222. These drawings are provided only as representations or symbolic identifiers of the components, and should not be understood to define or limit the functions or features of the device. In different implementations, the components can incorporate or include access to other capabilities that can enhance performance and/or minimize errors. For example, a gyroscopic sensor and/or accelerometer and associated processing can provide important information to the system regarding the device's orientation and rotation. Thus, in some implementations, the device may include provisions 420 for highly accurate recognition of movement within a 3D coordinate space as well as detection of movement when turning through measurement of angular velocity and acceleration. This information can in turn be used by the system when determining the position and/or motion of real-world objects.

In addition, as noted earlier, the device 100 can be configured to communicate to a cloud service or network ("cloud") 410. The cloud 410 can refer to a wide array of servers that provide information to the device and receive information from the device. This connection facilitates software updates, machine learning algorithm changes, classification requests, help services, and other data. In some implementations, only a portion of the classification data may be available locally, while a great deal more data may be accessible through the cloud 410. Some examples of training and classification data collection and generation are described with respect to FIG. 5.

Figure 5:
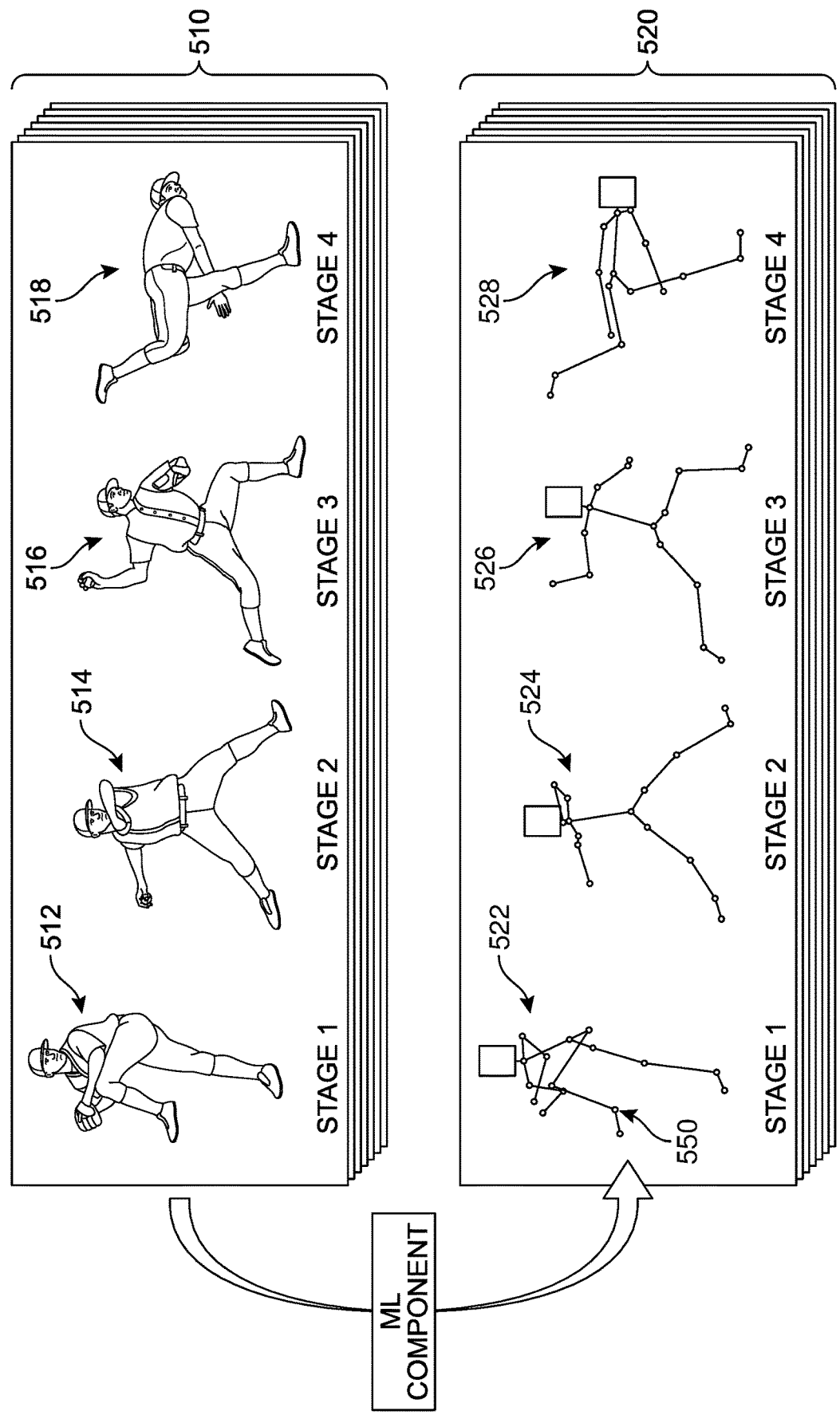
FIG. 5 is a schematic diagram presenting an implementation of a method of identifying features in an image.

As noted above, in different implementations, the system can be trained using data generated by machine learning models in order to identify pitching action, to identify objects such as balls, persons, and/or to identify various hand gestures. Such data may be generated following the accumulation, review, and/or analysis of a large number of baseball-related imagery that may serve as a training set. As a general example, FIG. 5 shows a set of training data 510 (represented by the layers of images) corresponding to specific pitching action stages that can be fed or inputted into an ML program. The number of photos can range from 100 to over 100,000. In addition, in some implementations, the device can be configured to transmit image data captured locally during gameplay to the cloud or the local ML program to provide supplemental training data that can serve to fine-tune the ML identification for a particular player and/or increase the training set for future devices or updates to the current device. In one implementation, a first ML program model can be configured to identify skeletal action in each image, as shown in the corresponding identifier images 520. Generally, the stages of an overhead throw or pitch include a wind up, stride, cocking, acceleration, deceleration and follow through. For purposes of simplicity, in FIG. 5, the pitching actions have been divided into four "action buckets" or stages, including Stage 1, Stage 2, Stage 3, and Stage 4. In this case, Stage 1 of the pitch corresponds to a wind-up, Stage 2 correspond to early cocking, Stage 3 corresponds to late cocking, and Stage 4 corresponds to follow-through. While one type of pitch is illustrated in FIG. 5, it should be understood that in different implementations, the training data set will include a wide range of pitch types, including but not limited to Fastballs (such as Four-seam, Two-seam, Cutter, Splitter, and Forkball), Breaking Balls (such as Curveball, Slider, Slurve, and Screwball), and Changeups (such as Changeup, Palmball, Circle Changeup).

In different implementations, a training system may be used that includes a second ML model (which may be referred to as an "ML model training module") configured to generate a trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, a size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

In some implementations, the ML models and/or their corresponding object classification systems can be configured to use, among other things, machine learning and inference techniques to identify and/or classify real-world objects based on image data including image data for the real-world objects. Machine learning techniques may generate one or more models for identifying and/or characterizing real-world objects based on a corpus of training data in the form of labeled or otherwise previously characterized image data. In some implementations, one or more portions of the training data may be provided via the device(s) itself. Furthermore, the training data may be continually updated and one or more of the models used by the object classification system can be revised or regenerated to reflect the updates to the training data.

In some implementations, the model may also incorporate a space classification system that is configured to use, among other things, machine learning and inference techniques to identify, classify, and/or determine boundaries of physical spaces. Machine learning techniques may generate one or more models for identifying, classifying, and/or determining boundaries of physical spaces based on a corpus of training data, one or more portions of which may be provided. This training data may also be continually updated and one or more of the models used by the space classification system revised or regenerated to reflect the updates to the training data.

Various ML algorithms and techniques for training ML models are discussed in U.S. Patent Application Publication Numbers 2013/0346346 (published on Dec. 26, 2013 and entitled "Semi-Supervised Random Decision Forests for Machine Learning"), 2014/0122381 (published on May 1, 2014 and entitled "Decision Tree Training in Machine Learning"), 2014/0172753 (published on Jun. 19, 2014 and entitled "Resource Allocation for Machine Learning"), 2015/0248764 (published on Sep. 3, 2015 and entitled "Depth Sensing Using an Infrared Camera"), 2015/0248765 (published on Sep. 3, 2015 and entitled "Depth Sensing Using an RGB Camera"), 2017/0132496 (published on May 11, 2017 and entitled "Hardware-Efficient Deep Convolutional Neural Networks"), 2017/0206431 (published on Jul. 20, 2017 and entitled "Object Detection and Classification in Images"), 2017/0236286 (published on Aug. 17, 2017 and entitled "Determining Depth from Structured Light Using Trained Classifiers"), U.S. patent application Ser. No. 15/870,783 (filed on Jan. 12, 2018 and entitled "Automated Collection of Machine Learning Data"), and 2017/0262768 (published on Sep. 14, 2017 and entitled "Depth from Time-of-Flight Using Machine Learning"), which are each incorporated by reference herein in their entireties.

In FIG. 5, the training data 510 can include depth image data that is processed by a training event detector (which may utilize services provided by a remote system), and using the first ML model, can be configured generate a "skeleton" based on depth image data, such as a first skeleton 522 identifying multiple vertices 550 for a first pitching pose 512 represented in Stage 1. In some implementations, the training event detector generates training event instance data items labeled with vertices such as the vertices 550. The vertices identified by training event instance data may then be translated from positions in a depth image (which may, for example, be three-dimensional positions) to corresponding positions in a corresponding two-dimensional RGB image. In some implementations, a device-generated training data item, in some cases including labels identifying the positions of the translated vertices, can be produced using the RGB or other image data and transmitted to a remote training system. Over time, the remote training system can be configured to receive and accumulate more and more device-generated training data items from locally operated assistive devices and/or other training data collection devices, thereby increasing the amount and variety of training data available for ML model training, resulting in increased accuracy, effectiveness, and robustness of trained ML models.

In different implementations, a second ML model (also referred to as an ML clustering program) can be used to create a second training data set for classifying or labeling the skeletal actions into appropriate or useful reference identifiers. In some implementations, any tag or label associated with the first pose 512 shown in Stage 1 can also be conveyed, transferred, attached to, tagged, linked, and/or associated with the resulting skeletal data (here, first skeleton 522). Similarly, any tag(s) for the second pose 514 in Stage 2 can also be associated with the resulting skeletal data (here, second skeleton 524), tag(s) for the third pose 516 in Stage 3 can be associated with the resulting skeletal data (here, third skeleton 526), and tag(s) for the fourth pose 518 in Stage 4 can be associated with the resulting skeletal data (here, fourth skeleton 528). Thus, as the device captures images and generates corresponding skeletal data via the first ML model, a second ML model can be trained to detect a particular action or sequence and then one or more of these specific pitch poses can be automatically identified and classified. These pose classifications can then be paired with specific audio signals via a third ML model, as will be discussed below with respect to FIG. 7.

Figure 6A:
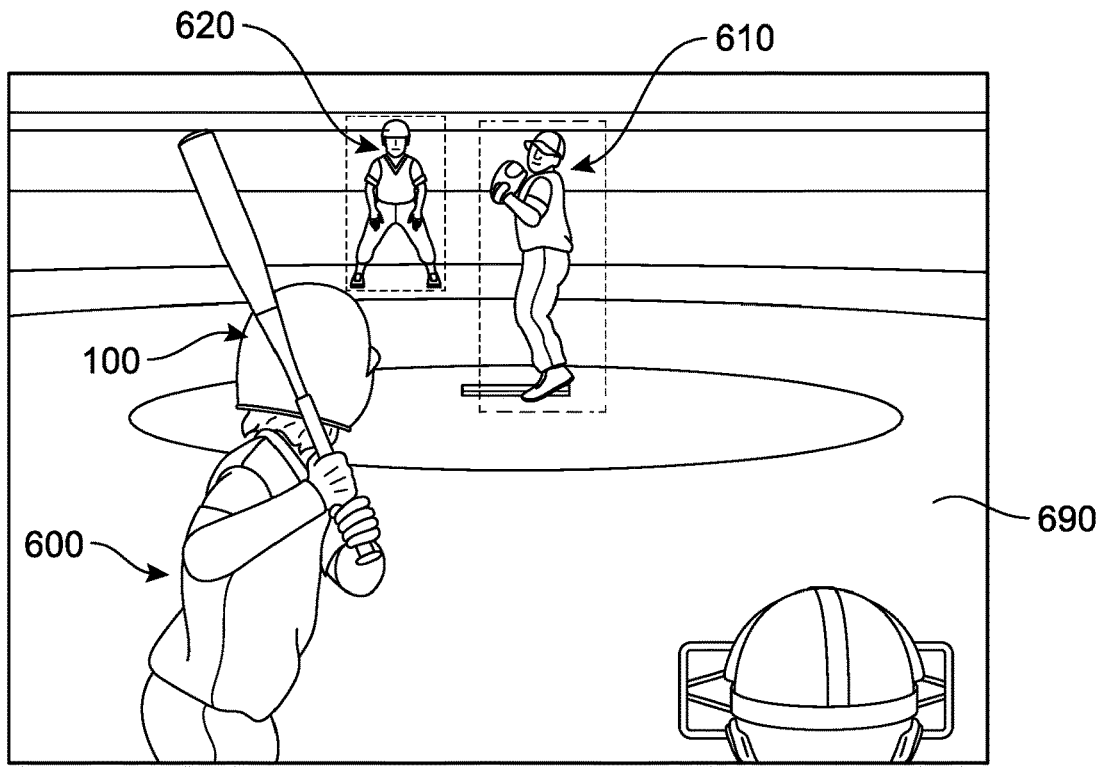
FIGS. 6A and 6B depict an example of a visual image being converted to a soundscape.
Figure 6B:
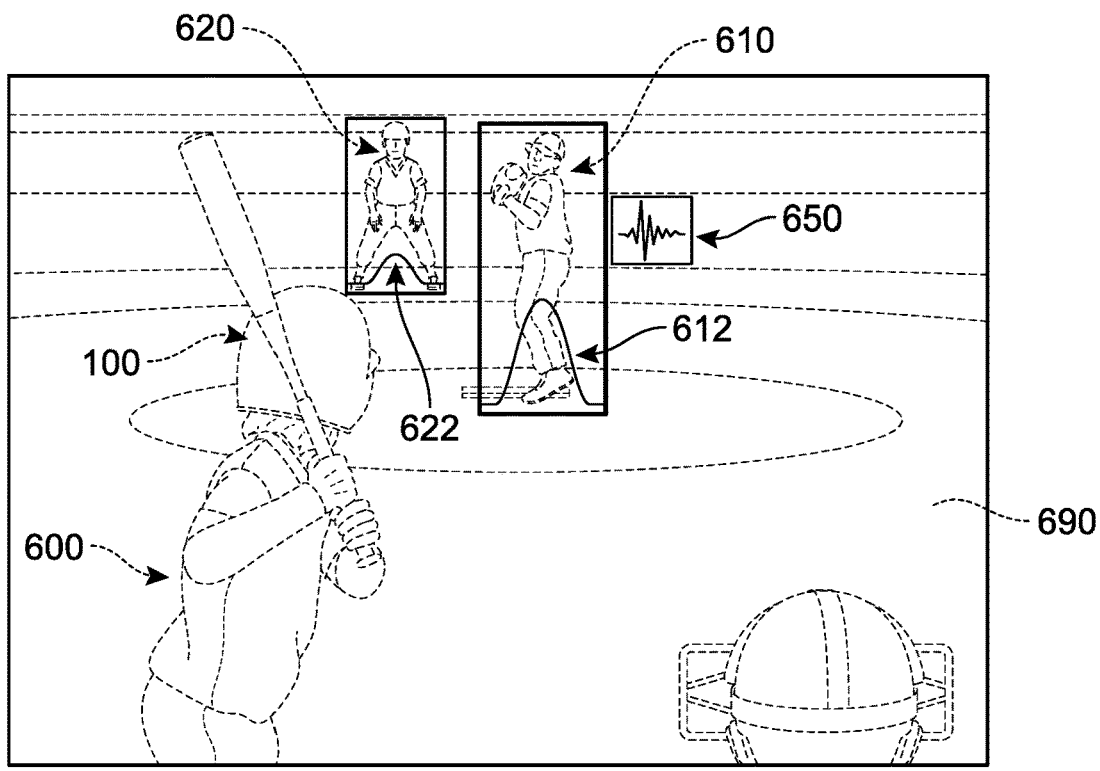

It can be understood that in order for a vision-impaired player to act on information relevant to gameplay, the device should provide the missing sensory input in a form that can be readily received and understood by the player. The illustrations of FIGS. 6A and 6B provide an example of one possible translation or correlation between visual input and auditory input. In this example, the image of FIG. 6A is encoded by a depth camera and can be converted to an acoustic representation that will be referred to here as a "soundscape." In FIG. 6A, as a blind player 600 wearing device 100 prepares to bat on a baseball field 690 by orienting towards objects such as a pitcher 610 and a catcher 620, there can be specific sounds that can be associated with each object. These sounds can be broadcast to the blind player 600 via device 100 and provide the blind player with a fine-tuned form of sensory substitution. For example, a player's ability to successfully recognize the auditory patterns of the soundscape and perceive them as corresponding to particular objects and poses may be facilitated if at least some acoustic invariants correspond to some visual invariants.

In FIG. 6B, the visual landscape is depicted by dotted line to signify the absence of visual input for a blind player. Instead, soundwaves are overlaid on some of the objects to illustrate an example of a soundscape. Thus, the pitcher 610 is associated with a first soundwave 612 and the catcher is associated with a second soundwave 622. During gameplay, information related to the pitcher is highly significant as a player prepares to bat. Thus, in one implementation, the soundscape provided via device 100 will focus primarily if not entirely on the actions of the object that has been classified via ML models as a pitcher (see FIG. 5). The soundscape preferences may also be adjusted by the player via hand gestures or other input means. In this case, the device 100 produces an auditory signal 650 that represents the type of object being detected, and the specific pose of such object during substantially real-time. For purposes of this application, the term "real-time" relates to a device and/or system in which input data is processed within milliseconds so that it is available virtually immediately as feedback. Thus, with changes in the object and the object's pose over the passage of time, the auditory signal(s) emitted by device 100 will also change in a manner that can capture and present the shifting visual information for the player in real-time.

Figure 7:
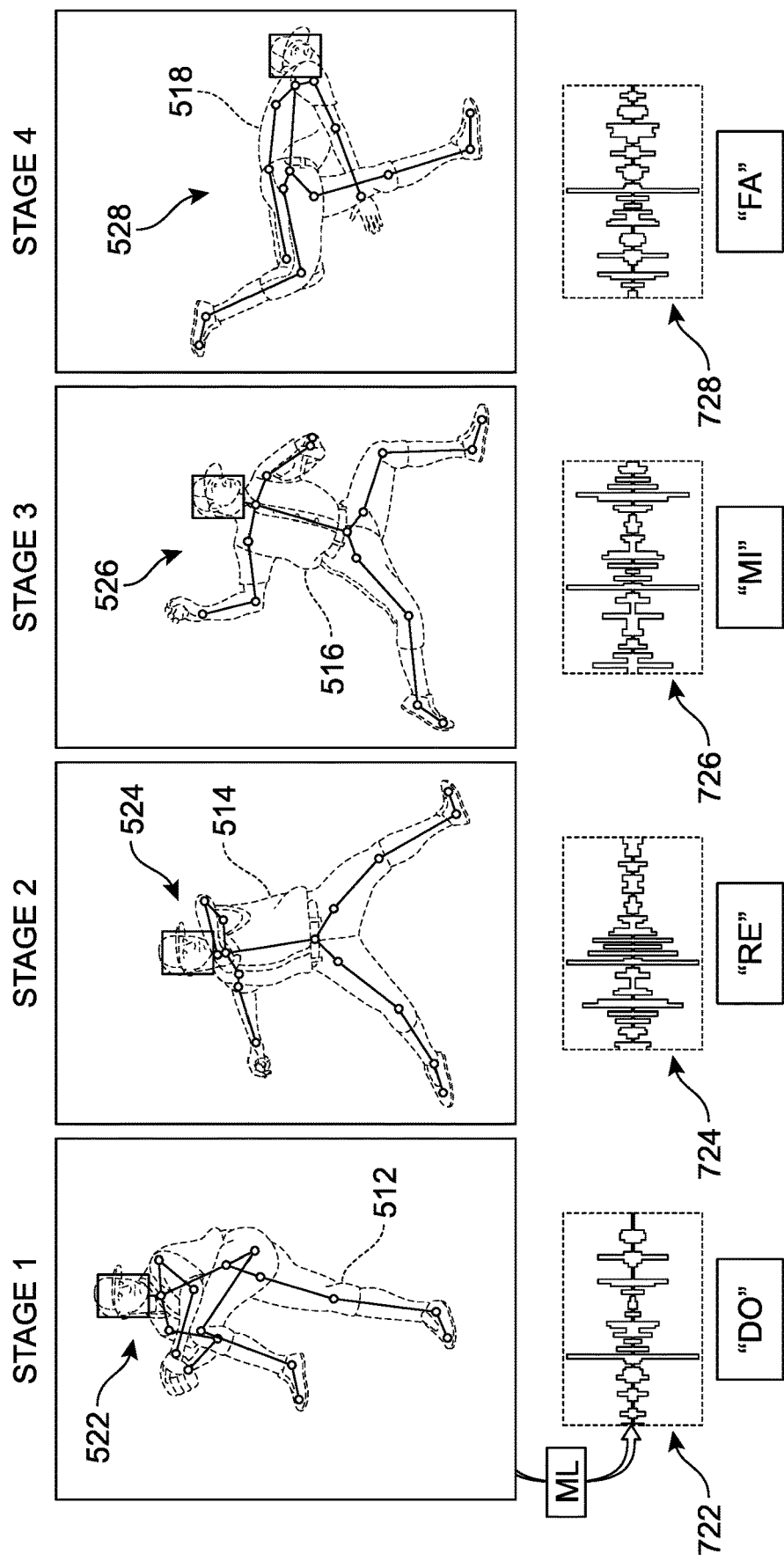
FIG. 7 is an implementation of a method of assigning specific audio signals to different poses.

Referring next to FIG. 7, a schematic depiction of an implementation of a series of sound pairings that can be provided to a player during use of the device is presented. In FIG. 7, the skeletal poses shown along the upper row have been generated via the first ML model (see FIG. 5). Each of these poses has been determined by a second ML model to fall into a pre-defined 'action bucket' or classification category. The lower row illustrates an example of the function of a third ML model that is trained to pair the recognized pose with a specific sound type. In this case, each of the four poses are uniquely paired with or assigned to a particular sound. For example, the skeletal action of the first pose 512 (here first skeleton 522), is shown as being paired to a first sound 722 via the third ML model. Similarly, skeletal action of the second pose 514 (here second skeleton 524), is shown as being paired to a second sound 722, skeletal action of the third pose 516 (here third skeleton 526), is shown as being paired to a third sound 726, and skeletal action of the fourth pose 518 (here fourth skeleton 528), is shown as being paired to a fourth sound 728. It can be seen that in this example, each of first sound 722, second sound 724, third sound 726, and fourth sound 728 differ from one another.

In different implementations, the device can produce distinct beeping or musical sounds to identify a pitchers position and location. Similarly, this approach can be used to indicate the position of field players and the base locations. For example, distinct zonal marking audio cues, similar to commercial stud finders, can be emitted for objects that are relevant to gameplay but remain substantially stationary during a game. In some implementations, the intensity and frequency between two sounds can be used by the player to determine the object's action and/or pitching stage.

Thus, it can be understood that the computer processor of the assistive device includes storage and instructions that allow it to obtain image data for a real-world object in three-dimensional physical space as observed by the depth camera. The assistive device can also automatically classify the object as being associated with an object classification based on the obtained image data. Based on this classification, the assistive device will automatically identify or generate an audio signal that directly corresponds to or is uniquely representative of the object classification. This audio signal can then be emitted through the headphones for the benefit of the blind player.

Furthermore, the same process can be repeated to provide ongoing or real-time audio feedback to the player. The assistive device can continue to capture additional image data for the object while the object (for example, the pitcher) changes pose over a period of time, and automatically determine updated pose classifications for the object, and thereby generating repeated audio signals based on the updated poses for the object.

Through this process, a user may be able to readily distinguish the different poses based on the sound emitted by the device. The third ML model and/or its training set can be included in or be readily accessible by the device via the cloud and serve as a sensory translation bridge between the depth sensing camera and the headphones. In one implementation, the device can be configured to generate a livestreaming sensory substitution soundscape that can be relied on by the user during gameplay.

The illustrated waveforms and text in FIG. 7 are provided only to symbolize sounds, and should not be understood to limit or indicate the actual sound that may assigned to these poses. Furthermore, in different implementations, these sounds can be customized, adjusted, and/or selected by a player. For example, sounds may be added by a player, downloaded from the cloud, or selected from a pre-set sound menu provided with the device system. The sounds can be tuned by the user for volume, intensity, type, and other characteristics.

As discussed earlier, for a vision-impaired player to act on information relevant to gameplay, the missing sensory input should be provided in a form that can be readily received and understood by the player. Generally, auditory stimuli, when delivered to mimic sounds that are naturally associated with a moving object or specific event, can be more intuitive for users when generating sensory substitution. Thus, in some implementations, the device can be configured to maximize the intuitiveness of sound and object pairings from the real-world. A motion cue that is particularly relevant and intuitive is one most people experience daily—the Doppler shift. The frequency shifts are caused by changes in the spacing of each successive wave front such that approaching objects produce a systematic increase in frequency while receding objects produce a decrease in frequency. In some implementations, this effect can be incorporated into the device framework described herein to provide the user with a much more intuitive experience.

Figure 8:
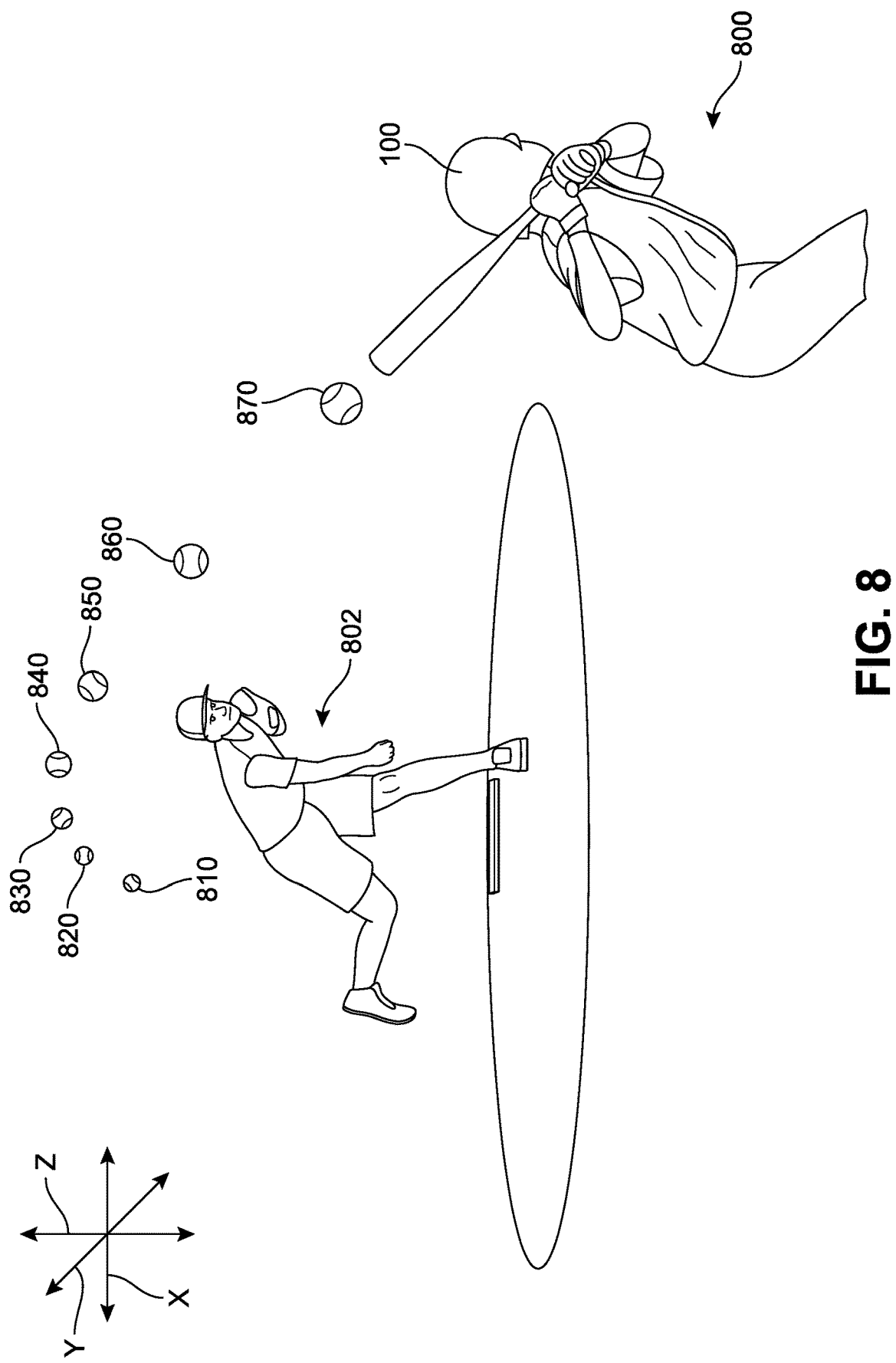
FIG. 8 illustrates an example of a blind player using an implementation of an assistive device.

Providing reliable, effective signals that can establish a ball's orientation, trajectory, position, and/or speed can be critical for blind players during gameplay. Referring to the sequence of FIGS. 8-10, an implementation of the type of sensory substitution that can be generated for an object in motion is depicted. In FIG. 8, a blind player 800 is shown at bat, preparing for a ball being pitched by pitcher 802. The ball is illustrated across multiple coordinates to represent one sample trajectory of a ball in flight that may occur during gameplay. For example, the ball may occupy any point in three-dimensional space, as symbolized by ($x_n$, $y_n$, $z_n$), where $x_n$ refers to a point along the x-axis, $y_n$ refers to a point along the y-axis, and $z_n$ refers to a point along the z-axis. Thus, for purposes of illustration, a first ball position 810 can be understood to occupy a space identified by a first set of coordinates ($x_1$, $y_1$, $z_1$), a second ball position 820 occupies a space identified by a second set of coordinates ($x_2$, $y_2$, $z_2$), a third ball position 830 occupies a space identified by a third set of coordinates ($x_3$, $y_3$, $z_3$), a fourth ball position 840 occupies a space identified by a fourth set of coordinates ($x_4$, $y_4$, $z_4$), a fifth ball position 850 occupies a space identified by a fifth set of coordinates ($x_5$, $y_5$, $z_5$), a sixth ball position 860 occupies a space identified by a sixth set of coordinates ($x_6$, $y_6$, $z_6$), and a seventh ball position 870 occupies a space identified by a seventh set of coordinate ($x_7$, $y_7$, $z_7$). In this example, each set of coordinates differs from one another. For sighted players, the determination of the position of the ball as it moves across the pitch toward the player is based primarily on the visual signals received showing the movement of the ball. In order to permit blind players to "see" the ball's trajectory, the device can be configured to emit a series of sounds that directly correspond to the ball's position in three-dimensional space. Furthermore, in order to provide information regarding the ball's approach and speed, the sounds produced by the device can be emitted with varying frequency. In some implementations, the sounds can approximately or substantially mimic or simulate what the player would hear if the ball itself were equipped to emit a sound as it is in flight. In other words, for each set of coordinates, the device can be configured to generate an audio signal that is unique or 'keyed' to that particular coordinate space relative to the location of the player and the device. In addition, the frequency of the signals generated by the device can increase as the ball approaches the player, or decrease as a ball moves away from the player, as discussed above with respect to the Doppler shift.

In different implementations, the computer processor of the assistive device includes storage and instructions that allow it to obtain image data for a variety of real-world objects in three-dimensional physical space as observed by the depth camera. The assistive device can automatically classify an object (for example, a baseball) as being associated with an object classification as well as automatically determine the location or position of the object relative to the assistive device. This information can be used to identify the particular audio signal that corresponds to the determined position of the object, as assigned through machine learning programs. The device can continue to capture ongoing image data for the object while the object moves through physical space over a period of time, as well determine and update its estimated position. This information can be used by the device to automatically identify further audio signals based on its classification and position and provide them to the listener.

Figure 9:
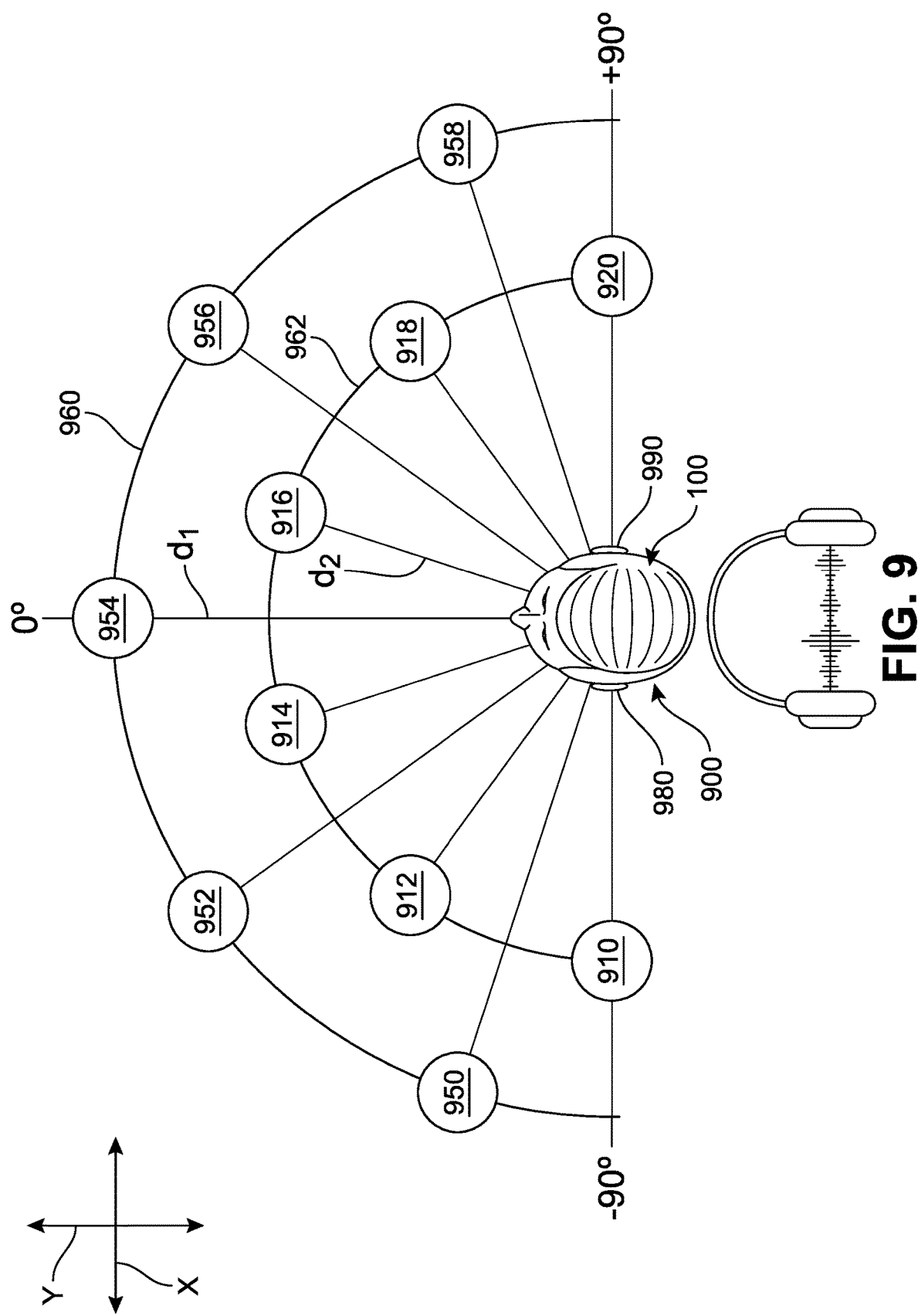
FIG. 9 is a schematic representation of an example of possible object locations along a horizontal direction relative to an assistive device.

Referring next to FIG. 9, a schematic diagram is shown to better illustrate some of the proposed implementations. In FIG. 9, a two-dimensional "bird's eye" view is presented of a player 900 wearing device 100. A ball or other object can occupy numerous positions across a horizontal plane relative to the player 900 and device 100 along the horizontal (X-Y) plane, and this is represented by the plurality of circular 'ball' symbols also included in FIG. 9. It should be understood that the values provided in the examples below are for illustrative purposes only and are not intended to limit the range or characteristics of auditory signals that may be generated or emitted by the device in any way.

In some implementations, in order to reliably position the sounds in virtual auditory space, the interaural amplitude difference (IAD), interaural time difference (ITD), and intensity may be adjusted to correspond to the type of sound a user would hear were the ball itself emitting a sound. Thus, for objects such as a first ball 954 disposed directly in front of the listener (at 0° azimuth), the associated sound would reach the left and the right ears at the same time and have the same intensity level at the two ears. However, when the object is located more toward one side, its associated sound would reach one ear before it reaches the other ear, giving an ITD. In general, the maximum ITD for a head of average size is about 0.69 ms for a sound at +/−90° azimuth (directly to the left or right) represented by a second ball 910 and a third ball 920. The IAD will also increase with increasing azimuth away from 0, but the maximum IAD would also depend on frequency, being greater at high frequencies than at low frequencies. In some implementations, the device can be configured such that the most extreme combinations of IAD and ITD values appear to give the player the impression of objects located at +/−90° azimuth (directly opposite the left or right ear), while intermediate ITDs and IADs suggest intermediate impressions of location, as illustrated in FIG. 9.

Thus, in different implementations, the X-Y coordinate space around the player 900 can be simulated in a stereoscopic soundscape. In other words, the player 900 may hear a sound differently between the left earphone 980 and right earphone 990 to represent the spatial position of the ball relative to the device. As one non-limiting example, the first ball 954 may present as a sound emitted through both the left earphone and right earphone simultaneously (50:50). However, a fourth ball 950 may present as a sound emitted through the left earphone and, following a 0.55 ms delay, the same sound being emitted through the right earphone (90:10). Similarly, a fifth ball 952 may present with a 0.27 ms delay between the left earphone and right earphone (70:30). Conversely, a sixth ball 956 and a seventh ball 958 may each present initially through the right earphone and then through the left earphone, following a 0.27 ms delay (30:70) and a 0.55 ms delay (10:90) respectively.

In some implementations, these patterns can change as a ball approaches a player. In another non-limiting example, the second ball 910 may present as a sound emitted through the left earphone and, following a 0.69 ms delay, the same sound through the right earphone (100:0). Similarly, eighth ball 912 may present with a 0.42 ms delay between the left earphone and right earphone (80:20), and a ninth ball 914 may present with a 0.18 ms delay between the left earphone and right earphone (60:40). Conversely, a tenth ball 916, an eleventh ball 918, and the third ball 920 may each present initially through the right earphone and then through the left earphone, following a 0.18 ms delay (40:60), a 0.42 ms delay (20:80), and a 0.69 ms delay (0:100) respectively.

In another implementation, the intensity or loudness of the sound generated by the device can also be configured to correspond to a distance between the object and the player. For example, referring to FIG. 9, two rings are shown; an outer ring 960 is at a distance $d_1$ from the device 100 and an inner ring 962 is at a distance $d_2$ from the device 100. In one implementation, sounds generated in response to balls detected at farther distances represented by the outer ring can be at a lower intensity (quieter) than the sounds generated in response to balls detected at nearer distances represented by the inner ring. In other words, as a ball approaches a player, the device can be configured to generate a sound that increases correspondingly in loudness. In one implementation, as an object is approaching, its associated audio signature can be configured to broaden both in the frequency spectrum and in the stereo panning to allow for an estimation of its size variation.

Figure 10:
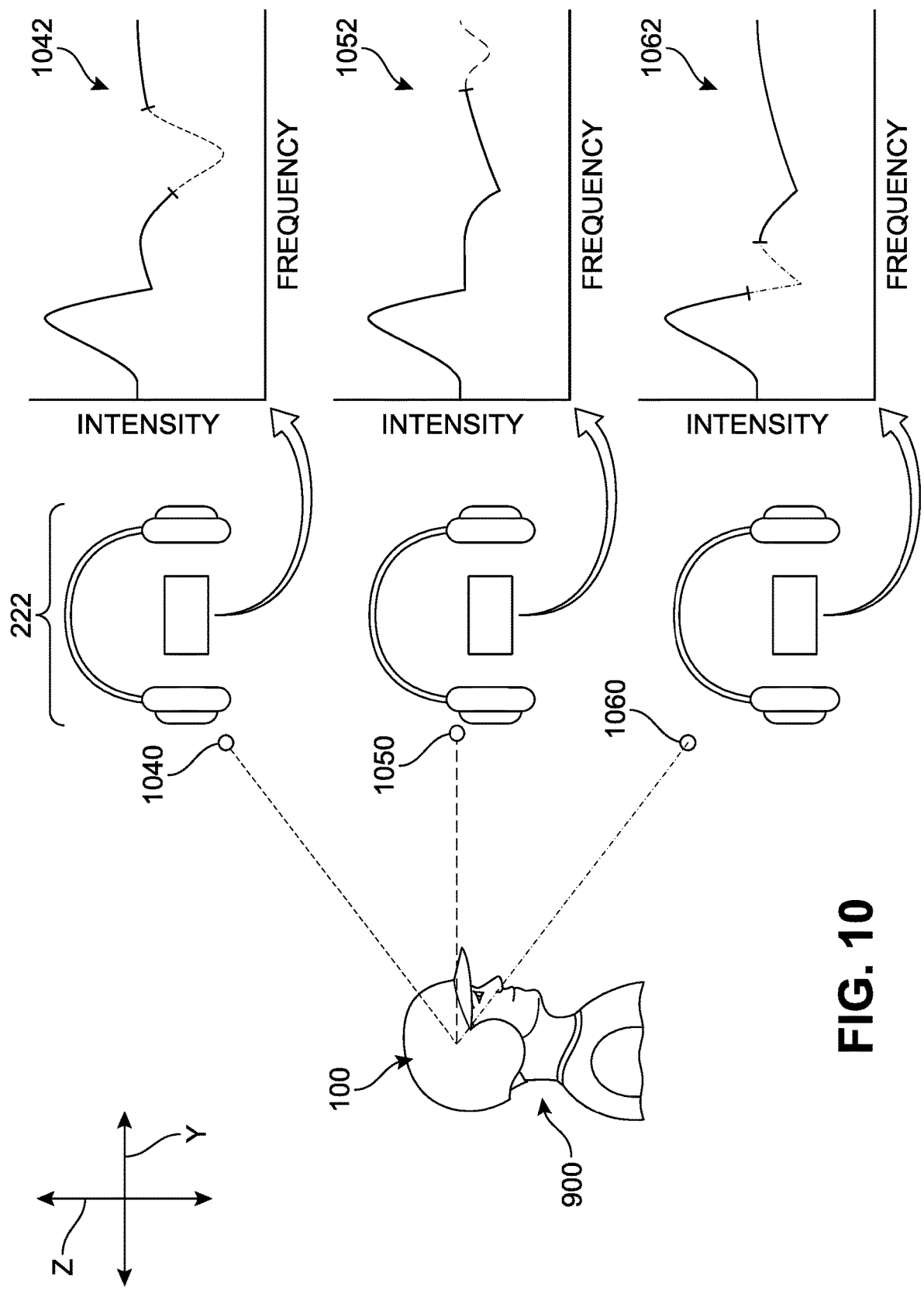
FIG. 10 is a schematic representation of an example of possible object locations along a vertical direction relative to an assistive device.

As noted earlier with respect to FIG. 8, the device can include provisions to generate sounds that accurately map the location of a moving object through a three-dimensional space. In some implementations, the sounds generated by the device may be configured to represent the position of an object along the vertical plane (up-down) as well as the horizontal plane (as described with respect to FIG. 9), thereby providing a spatial position of the object in a simulated three-dimensional soundscape. In FIG. 10, a schematic drawing illustrates one non-limiting example of such a process. In FIG. 10, a two-dimensional side view is presented of player 900 and device 100. Dotted lines between the player and the balls indicate approximately the direction of the device's field of view. For purposes of simplicity, only three directions are depicted, including an "upward" direction associated with a first ball 1040, a horizontal or normal direction associated with a second ball 1050, and a downward direction associated with a third ball 1060. A ball or other object can occupy numerous positions across a vertical axis relative to the player 900 and device 100 along the vertical (Z) axis. It should be understood that the values provided in the examples below are for illustrative purposes only and are not intended to limit the range or characteristics of auditory signals that may be generated or emitted by the device in any way.

In different implementations, the sound can be adjusted to accommodate the relative position of the ball along a Z axis. In one implementation, the intensity of a sound paired with a ball position can differ as the ball travels upward or downward. In FIG. 10, a graph showing a sample waveform for each ball is presented to the right-hand side of the drawing. These graphs represent an example of how a sound may change as the ball moves in the Z direction. The first ball 1040 has been assigned or is tagged to generate a sound represented by a first waveform 1042, the second ball 1050 has been assigned or is tagged to generate a sound represented by a second waveform 1052, and the third ball 1060 has been assigned or is tagged to generate a sound represented by a third waveform 1062. It can be seen that the first waveform 1042 includes a slow dip in intensity toward the third quarter in the frequency direction, the second waveform 1052 shows a small dip towards the end of the waveform, and the third waveform 1062 shows a sharp, medium dip toward a central region of the waveform. Thus, in different implementations, the device can be configured with the ability to automatically determine the position of an object in three-dimensional space, classify the object, determine whether the object is relevant, and playback audio that uniquely corresponds to the spatial position of the ball and its classification.

As a result, the device is able to present comprehensive auditory sensory information that can precisely encode both the orientation and the distance of a moving object for a listener. When an object moves, the corresponding audio signature emitted by the headphones can move within the frequency spectrum, intensity spectrum, and the stereo panning spectrum, allowing for a multi-dimensional evaluation of its trajectory. As described herein, these sounds can be configured to move from the left ear to the right ear and back, to simulate movement of an object from above to below and side to side in a manner similar to that of a ball that is fitted with an alarm sound. Furthermore, the sound pitch or frequency can be increased when the ball is thrown toward the vision-impaired batter, and the sound pitch or frequency can be decreased when the ball is thrown away from the batter, providing an intuitive experience similar to the Doppler effect observed in nature.

Figure 11:
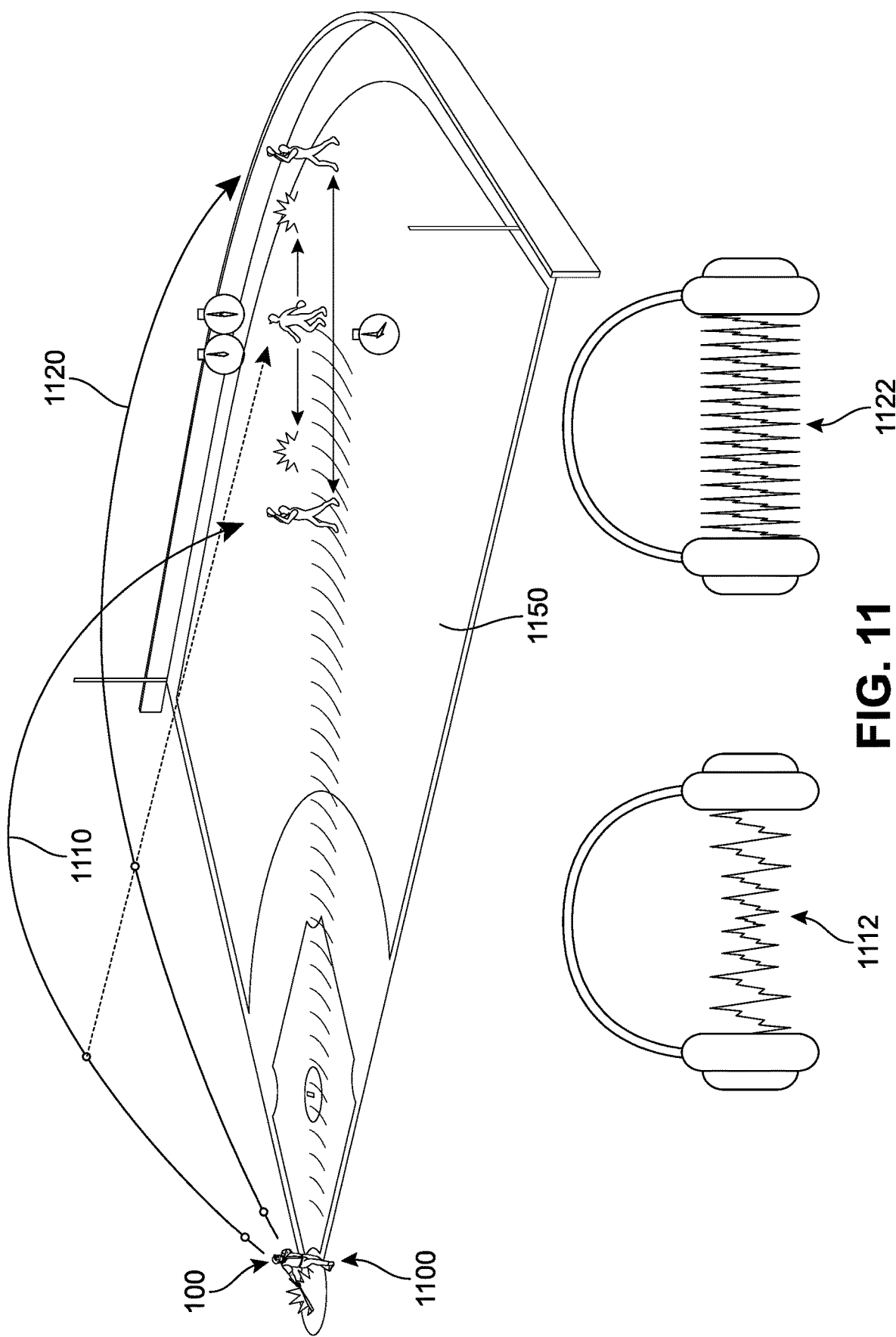
FIG. 11 is an isometric view of a baseball field and an implementation of possible audio signals that may be emitted for different ball trajectories.

While the discussion above has focused mainly on the applicability of the device during batting, such as during a pitch and the incoming flight of a ball toward a batter, it should be understood that its uses can extend to include additional aspects of gameplay. Referring to FIG. 11, a bird's eye view of a baseball diamond 1150 is illustrated. In different implementations, a blind player 1100 can follow the trajectory of a ball following a play. For example, after the player 1100 has successfully struck the ball, or while a player is "watching" another batter hit a ball, the ball may take one of numerous paths. Using techniques described above, the device 100 can continue to provide auditory sensory substitution for the ball in flight as it moves away from the player. In this example, the ball traveling along a first path 1110 will be associated with a first pattern of sounds ("first pattern") 1112, and the ball traveling along a second path 1120 will be associated with a second pattern of sounds ("second pattern") 1122 that is distinct from the first pattern 1112.

Thus, as the player faces the field, and/or when he/she moves or reorients, the device can emit a signal that indicates whether the ball is in his or her line of sight, as well as whether the ball may be accorded a status of a "fair ball" or "foul ball" or other classifications based on the rules of the game, and corresponding to the direction of his/her gaze (i.e., the device's field of view). The device is also configured to accommodate head motion and body orientation changes. The auditory signals can also be configured to indicate an approximate speed of the ball as it travels, and whether it was caught or fell to the ground. Catchers and other players arranged on the field may also be presented by various auditory signals, as well as relevant objects such as the bases, equipment, referees, and other objects. In some implementations, the device can receive signals from a network that can provide the player with various audio commentary or score updates. For example, the user can input a request via a hand gesture to listen to commentary from the most recent 30 seconds (or other periods of time) of the game, hear a team roster, weather updates, statistics for various players, estimate the size of the crowds in the stands, read information from a banner or display, or any other information that is or can be made accessible to the device.

Furthermore, the ability to discriminate faces and expressions can be highly significant for the player. It is commonly understood that any information that may provide insight into how the opposing team is going to play is greatly sought after, including the identity of the individual who is pitching. For example, emotional expressions provide relevant information and cues. Indeed, sighted players frequently observe and examine perceived pitchers' emotional expressions during professional baseball games. Sighted players have asserted that, in the short period of time directly prior to a pitch, the perceived emotional displays of the pitcher can provide information about what is about to occur and consequently may affect the future behavior of the batter. In some teams, players are trained at focusing on the pitcher and acquiring cues regarding the upcoming pitch, which includes assessing emotions of pitchers. This can allow a player to recognize and prepare for the tendencies and preferences of specific players on the other team. For example, in baseball, knowing a batter's tendency for swinging only at certain pitch types, or a pitcher's tendency to throw low balls in specific situations, can impact the way that a player prepares for a pitch or swing. Thus, in some implementations, the device described herein can be configured to provide audio feedback to the user describing the expressions or imputed emotional state of a player in the device's field of vision. Various hand gestures or other means of user input can be used to submit requests for these emotional assessments.

It can be understood that the computer processor of the assistive device includes storage and instructions that allow it to automatically classify an object and associate the object with an object classification. Depending on the classification, further or additional determinations or classification can occur, for example, if the initial classification has labeled the object as a person. In response to, for example, voice or hand gesture commands by a user, the assistive device can automatically identify specific regions or portions of the object and evaluate and classify the person's facial expressions. The device can then identify a specific audio signal that is associated with the specific facial expression classification.

It should be understood that, in different implementations, more than one stream of audio can be broadcast in a substantially simultaneous manner (i.e., in a single audio transmission) to the user. For example, a blind player wearing the device may be hearing a soundscape that includes beeping describing a pitcher's wind-up, as well as spoken words describing the emotional state of the pitcher at the same time. It is known that vision-impaired persons often develop an enhanced sensitivity to various sound-location cues, resulting from the blind listener's long-term experience of using sounds as their primary source of information for localizing sound sources and sound-reflecting objects. Thus, users can learn or be trained to very effectively distinguish different audio cues from a stream or transmission of overlapping audio signals.

Figure 12:
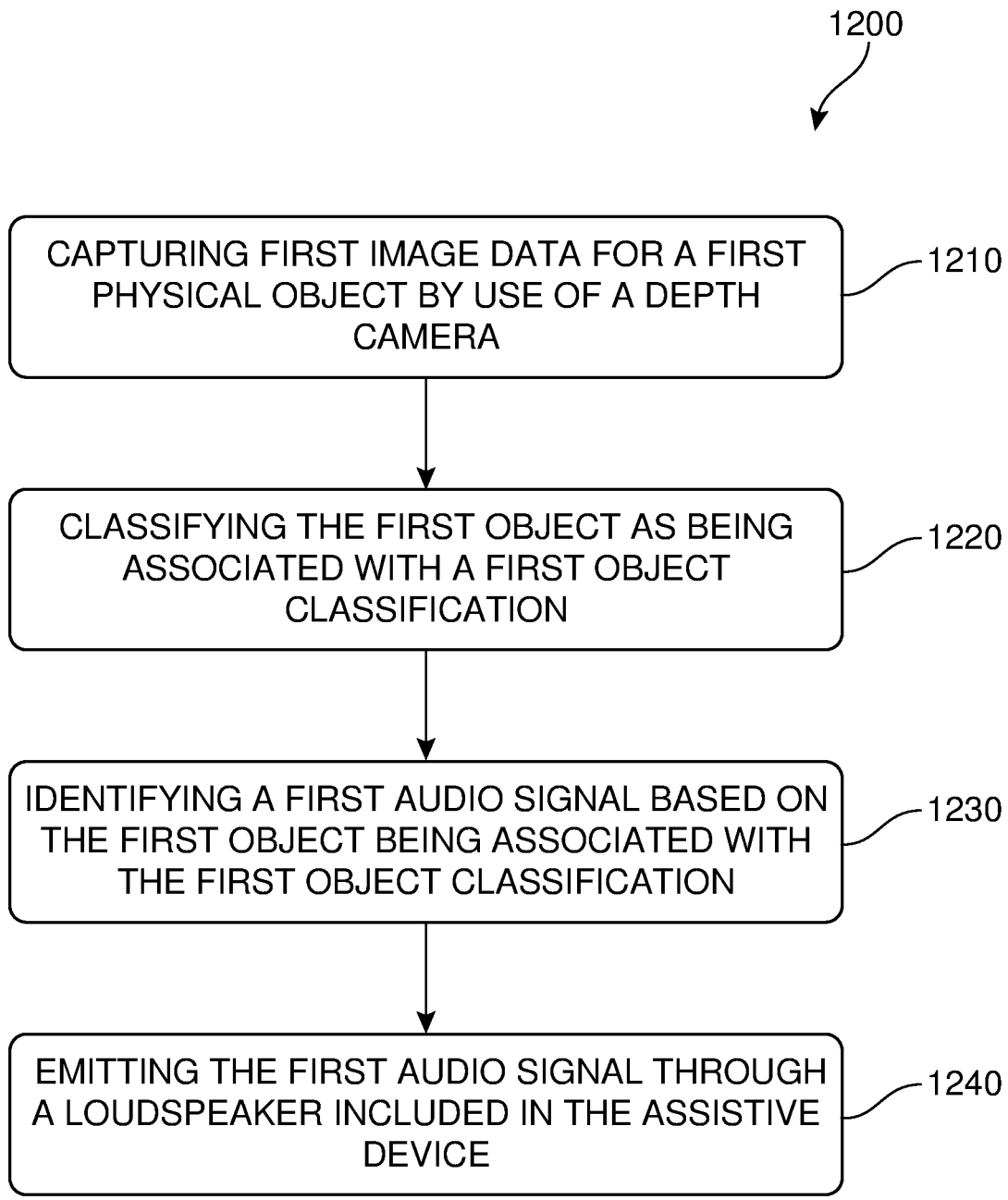
FIG. 12 is a flow chart presenting one implementation of a method of operation executed on an assistive device.

Referring now to FIG. 12, an overview of one implementation of a method 1200 of operation executed on the assistive device is presented. In FIG. 12, a first step 1210 includes capturing first image data for a first object included in a physical space observed by the depth camera, and a second step 1220 includes automatically classifying the first object as being associated with a first object classification based on the captured first image data. A third step 1230 involves automatically identifying a first audio signal based at least on the first object being associated with the first object classification. In a fourth step 1240, the method can include emitting the first audio signal through loudspeaker(s) included in the assistive device.

In other implementations, additional steps may be included. For example, another step may include automatically determining a first position in the physical space for the first object relative to the assistive device based on the first image data and automatically identifying the first audio signal based in part on the determined first position of the first object. In another example, the method may include capturing second image data for the first object while the first object moves through the physical space over a first period of time, and automatically determining a second position in the physical space for the first object relative to the assistive device based on the second image data. The method can further include automatically identifying a second audio signal based on the first object being associated with the first object classification and the second position of the first object, and emitting the second audio signal through the loudspeaker(s).

In another implementation, the method may also involve automatically determining updated positions for the first object relative to the assistive device based on the second image data, and repeatedly emitting audio signals through the loudspeaker(s) based on the updated positions for the first object, so as to provide a real-time auditory sensory substitution transmission for the first object. In some implementations, the method can include capturing second image data for the first object while the first object changes pose over a first period of time, automatically determining updated poses for the first object based on the second image data, and repeatedly emitting audio signals through the loudspeaker(s) based on the updated poses for the first object, so as to provide a real-time auditory sensory substitution transmission for the first object.

In another example, the method may further include automatically identifying a first portion of the first object based on the first image data, and automatically classifying the first portion as being associated with a first facial expression classification based on the first image data. The method can also include automatically identifying a second audio signal based at least on the first object being associated with the first facial expression classification, and emitting the second audio signal through the loudspeaker(s). In one implementation, the method includes increasing a frequency of the auditory transmission when the first object approaches the assistive device and decreasing a frequency of the auditory transmission when the first object moves further away from the assistive device.

In some implementations, the method may involve automatically classifying a plurality of objects included in the physical space as being associated with respective object classifications, based on second image data captured by the depth camera, automatically identifying a plurality of audio signals based at least on the plurality of objects being associated with their respective object classifications, and emitting the plurality of audio signal through the loudspeaker(s). In addition, the method may include capturing second image data for a second object included in the physical space observed by the depth camera, automatically classifying the second object as being associated with a first command classification based on the second image data, automatically identifying a second audio signal based at least on the second object being associated with the first command classification, and emitting the second audio signal through the loudspeaker(s).

Figure 13:
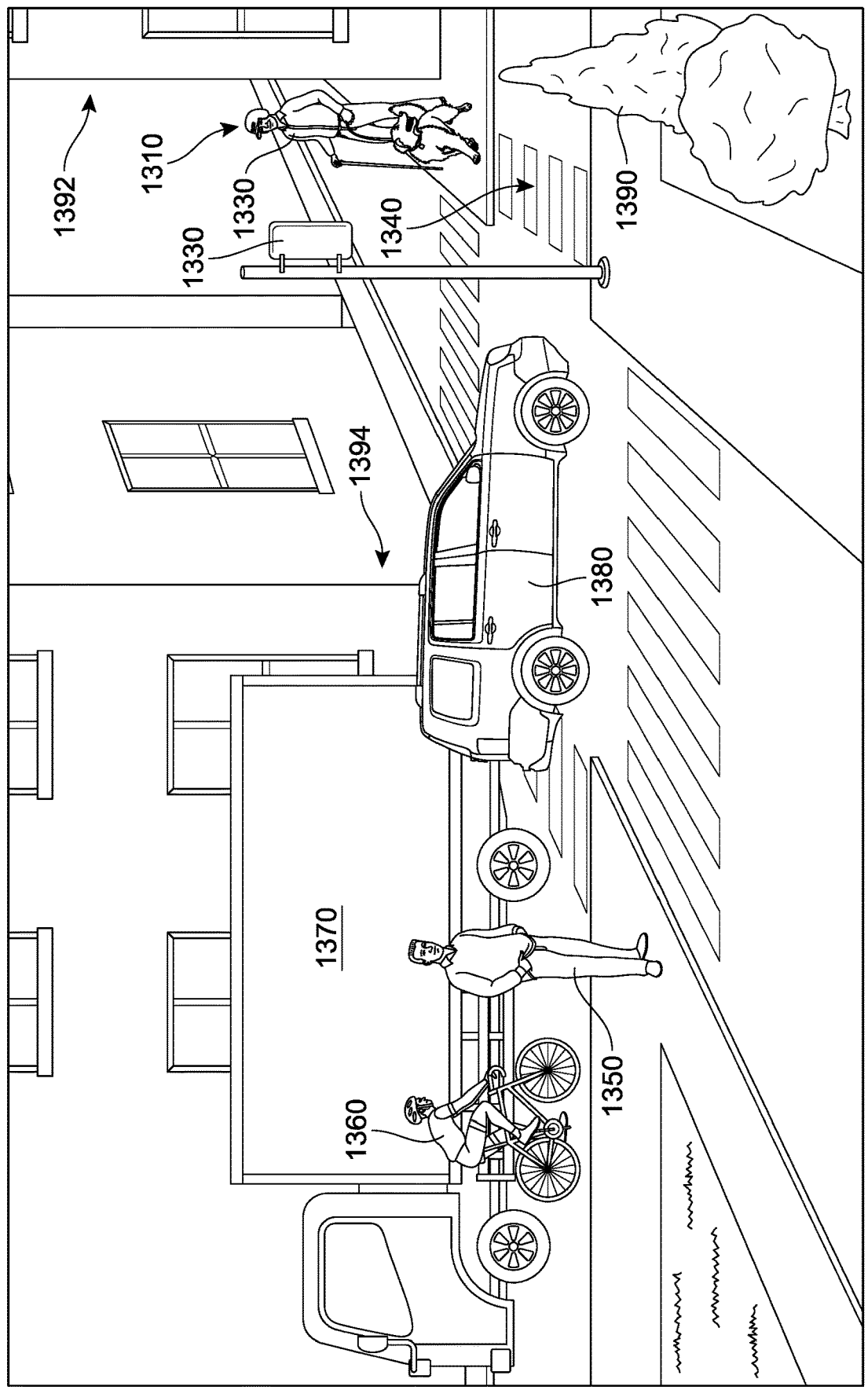
FIG. 13 is a general representation of a city block in which various real-world objects surround an individual who is using one implementation of an assistive device.
Figure 14:
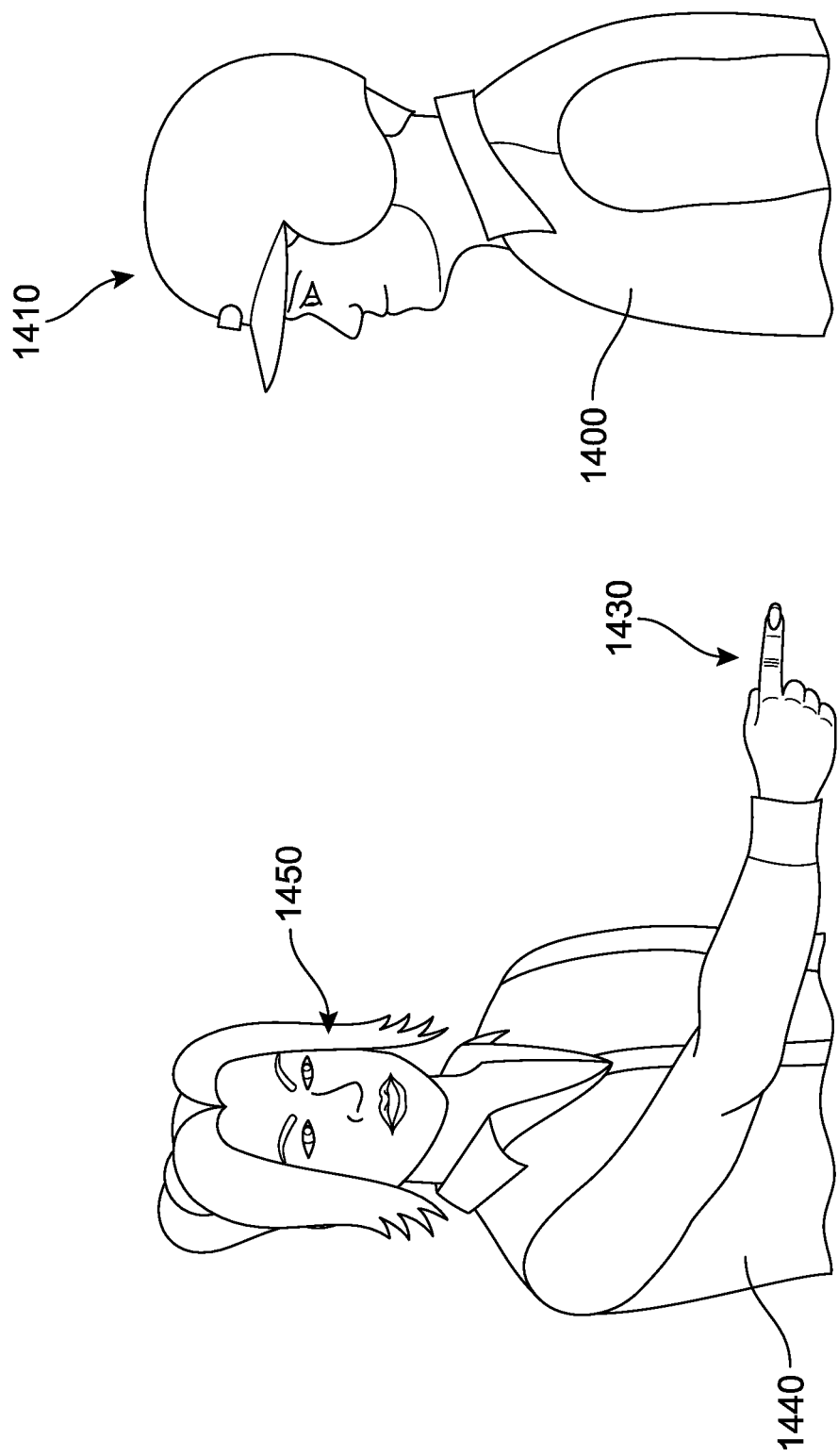
FIG. 14 is a depiction of two individuals communicating where one of the individuals is wearing an implementation of an assistive device.

In order to better appreciate the significance and broader applications of the systems and methods described herein, additional examples of its functions are presented with respect to FIGS. 13 and 14. In FIG. 13, a typical downtown or city intersection is illustrated. A blind person 1300 is positioned on one corner 1392, wearing a system 1310. It is well known that pedestrians are generally considered to be one sub-group of vulnerable road users, and that there are specific vulnerabilities, risks, and dangers that arise for blind pedestrians, which extend beyond those experienced by sighted pedestrians. Visually impaired individuals can experience a lack of confidence in going out alone or to unfamiliar places, or may find obstacles in the environment make navigation more difficult.

As an example, street crossing can be split into a number of challenges for a blind person, including accurate determination of an edge of a street, which street they are on, whether a crosswalk is available, the relative position of other pedestrians, vehicle proximity and type, the width of the crosswalk to be crossed, distinguishing signal & traffic patterns, ensuring appropriate and safe alignment on a crosswalk, being able to push a crosswalk signal button, assessing intersection geometry, and other such tasks.

Pedestrians with visual impairments traditionally attempt to listen to traffic patterns through several light cycles, and search the sidewalk area for poles with pushbuttons, as well as evaluate other sounds to make a safe crossing. However, walking along busy streets remains a difficult and challenging activity. In order to improve these types of experiences and facilitate immersion in real-world settings, the system can be configured for operation and use in environments beyond those associated with athletic events. In FIG. 13, the system 1310 is shown during use in typical cityscape surroundings. In different implementations, the system 1310 can receive information about the outside world using one or more of the mechanisms and methods described above with respect to FIGS. 1-12. Thus, as the blind person 1300 directs his or her gaze at different areas, he or she will be presented with highly specific and 'living' audio streams that directly correlate with the activity occurring around the person.

As some examples, a few real-world objects are illustrated in proximity to the blind person 1300. In a first example, the blind person 1300 is able to 'view' via the system 1310 one or more marked or labeled crosswalk areas 1340 on the road via a first audio signal presented by the system 1310. In addition, the system 1310 is configured to identify one or more crosswalk signals 1330, including what is being displayed on the signal (e.g. "STOP", "GO", "DON'T WALK", hand or walk symbols, etc.) via a second signal. Similarly, the system 1310 may be configured to identify shrubs 1390 via a third signal, as well as other substantially stationary objects, as well as adjacent buildings 1394 via a fourth signal. Of great importance is the identification of vehicles or traffic near the blind person 1300. The system 1310 can be configured to quickly identify various models and types of cars 1380 via a fifth signal or larger vehicles such as trucks 1370 via a sixth signal. Finally, an example of a fellow pedestrian 1350 is also shown, which may be translated for the user as a seventh signal.

It should be understood that each of the audio signals mentioned above can be configured to change in one or more aspects (e.g., frequency, loudness, pitch, type, and others described above with respect to FIGS. 1-12) in order to convey changes in relative location of the objects being described, as well as their size and classification. Furthermore, multiple streams of audio may be presented in order to provide an array of information regarding the surrounding environment. In some implementations, the objects themselves may be adapted to broadcast signals wirelessly to the system and enhance the accuracy and performance of the device.

In different implementations, the system can also be adapted for use in more intimate settings or personal interactions. One example of this is illustrated in FIG. 14, where a blind person 1400 fitted with a system 1410 is conversing with an individual 1440. During the conversation, the blind person 1400 can be readily able to participate and respond to any spoken questions, comments, instructions, or statements. However, in many cases, important non-verbal cues and communications are expressed during interactions, especially if a sighted person fails to recognize that they are speaking with a visually impaired person. In FIG. 14, as the two individuals speak to one another, it can be seen that the individual 1440 is making a hand gesture similar to that of pointing in a direction. Typically, this gesture would not be attended to by a blind person. However, the system 1410 is configured to detect and identify hand gestures, and can then convey the information to the user. In addition, facial expressions, as described earlier, can provide highly meaningful context to others. In this case, the individual 1440 appears generally upset, as shown in their expression 1450. Through use of the system 1410, the blind person 1300 can quickly receive information about the individual's 1440 perceived emotional state, and make a measured response that accommodates this additional information. Thus, the system 1410 can provide a wide range of benefits that can improve the everyday life of visually impaired persons.

As noted earlier, playing sports and participating in community activities can have a dramatically positive impact on physical and psychological factors for vision-impaired individuals. In addition, identification with teammates can foster their feeling of belonging and helps to develop their physical capacities. The possibility of joining sighted players in a game as provided by the disclosed implementations can increase blind people's involvement in their community and improves the perception of the blind by their peers. By broadcasting one or more audio streams that each carry different types of information to an individual corresponding to visual events, the device can provide blind players an opportunity to receive information for gameplay that allows for participation with sighted players and teammates that is both natural and authentic.

The detailed examples of systems, devices, and techniques described in connection with FIGS. 1-14 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-14 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 15:
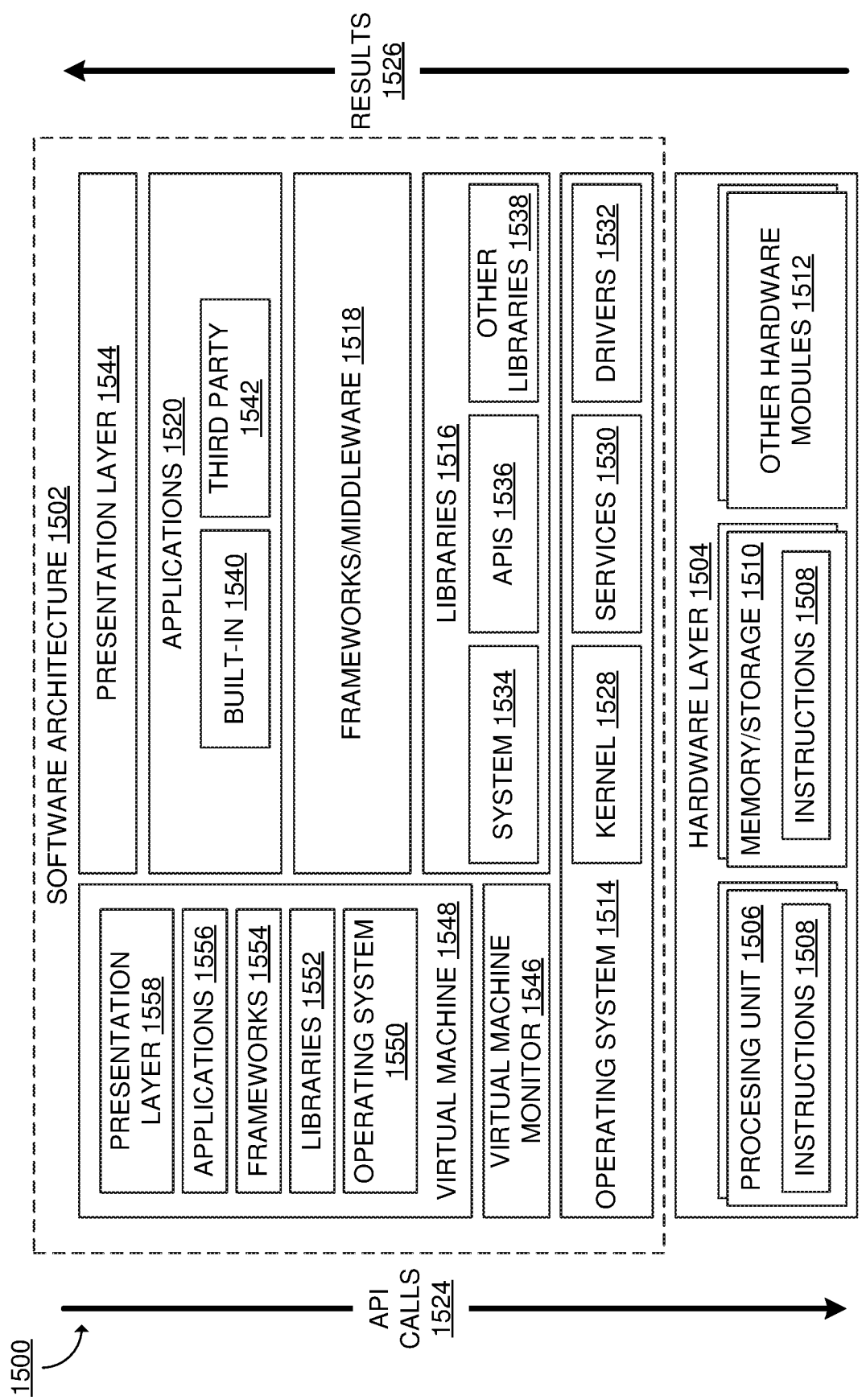
FIG. 15 is a block diagram of an example computing device, which may be used to provide implementations of the mechanisms described herein.

FIG. 15 is a block diagram 1500 illustrating an example software architecture 1502, various portions of which may be used in conjunction with various hardware architectures herein described, which may implement any of the above-described features. FIG. 15 is a non-limiting example of a software architecture and it will be appreciated that many other architectures may be implemented to facilitate the functionality described herein. The software architecture 1502 may execute on hardware such as a machine 1600 of FIG. 16 that includes, among other things, processors 1010, memory 1030, and input/output (I/O) components 1050. A representative hardware layer 1504 is illustrated and can represent, for example, the machine 1600 of FIG. 16. The representative hardware layer 1504 includes a processing unit 1506 and associated executable instructions 1508. The executable instructions 1508 represent executable instructions of the software architecture 1502, including implementation of the methods, modules and so forth described herein. The hardware layer 1504 also includes a memory/storage 1510, which also includes the executable instructions 1508 and accompanying data. The hardware layer 1504 may also include other hardware modules 1512. Instructions 1508 held by processing unit 1508 may be portions of instructions 1508 held by the memory/storage 1510.

The example software architecture 1502 may be conceptualized as layers, each providing various functionality. For example, the software architecture 1502 may include layers and components such as an operating system (OS) 1514, libraries 1516, frameworks 1518, applications 1520, and a presentation layer 1544. Operationally, the applications 1520 and/or other components within the layers may invoke API calls 1524 to other layers and receive corresponding results 1526. The layers illustrated are representative in nature and other software architectures may include additional or different layers. For example, some mobile or special purpose operating systems may not provide the frameworks/middleware 1518.

The OS 1514 may manage hardware resources and provide common services. The OS 1514 may include, for example, a kernel 1528, services 1530, and drivers 1532. The kernel 1528 may act as an abstraction layer between the hardware layer 1504 and other software layers. For example, the kernel 1528 may be responsible for memory management, processor management (for example, scheduling), component management, networking, security settings, and so on. The services 1530 may provide other common services for the other software layers. The drivers 1532 may be responsible for controlling or interfacing with the underlying hardware layer 1504. For instance, the drivers 1532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1516 may provide a common infrastructure that may be used by the applications 1520 and/or other components and/or layers. The libraries 1516 typically provide functionality for use by other software modules to perform tasks, rather than rather than interacting directly with the OS 1514. The libraries 1516 may include system libraries 1534 (for example, C standard library) that may provide functions such as memory allocation, string manipulation, file operations. In addition, the libraries 1516 may include API libraries 1536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1516 may also include a wide variety of other libraries 1538 to provide many functions for applications 1520 and other software modules.

The frameworks 1518 (also sometimes referred to as middleware) provide a higher-level common infrastructure that may be used by the applications 1520 and/or other software modules. For example, the frameworks 1518 may provide various graphic user interface (GUI) functions, high-level resource management, or high-level location services. The frameworks 1518 may provide a broad spectrum of other APIs for applications 1520 and/or other software modules.

The applications 1520 include built-in applications 1540 and/or third-party applications 1542. Examples of built-in applications 1540 may include, but are not limited to, a contacts application, a browser application, a location application, a media application, a messaging application, and/or a game application. Third-party applications 1542 may include any applications developed by an entity other than the vendor of the particular platform. The applications 1520 may use functions available via OS 1514, libraries 1516, frameworks 1518, and presentation layer 1544 to create user interfaces to interact with users.

Some software architectures use virtual machines, as illustrated by a virtual machine 1548. The virtual machine 1548 provides an execution environment where applications/modules can execute as if they were executing on a hardware machine (such as the machine 1600 of FIG. 16, for example). The virtual machine 1548 may be hosted by a host OS (for example, OS 1514) or hypervisor, and may have a virtual machine monitor 1546 which manages operation of the virtual machine 1548 and interoperation with the host operating system. A software architecture, which may be different from software architecture 1502 outside of the virtual machine, executes within the virtual machine 1548 such as an OS 1550, libraries 1552, frameworks 1554, applications 1556, and/or a presentation layer 1558.

Figure 16:
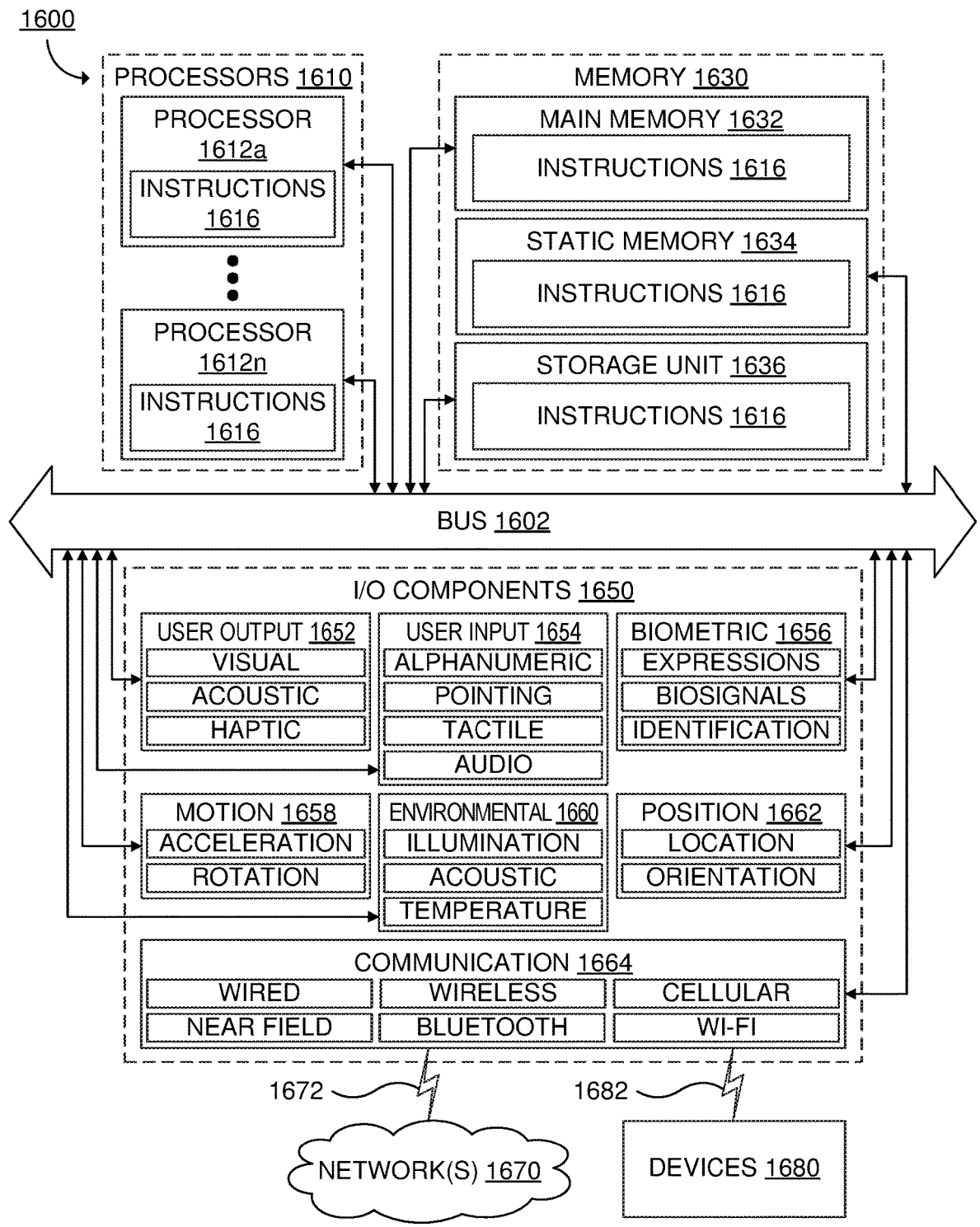
FIG. 16 is a block diagram illustrating components of an example machine configured to read instructions from a machine-readable medium.

FIG. 16 is a block diagram illustrating components of an example machine 1600 configured to read instructions from a machine-readable medium (for example, a machine-readable storage medium) and perform any of the features described herein. The example machine 1600 is in a form of a computer system, within which instructions 1616 (for example, in the form of software components) for causing the machine 1600 to perform any of the features described herein may be executed. As such, the instructions 1616 may be used to implement modules or components described herein. The instructions 1616 cause unprogrammed and/or unconfigured machine 1600 to operate as a particular machine configured to carry out the described features. The machine 1600 may be configured to operate as a standalone device or may be coupled (for example, networked) to other machines. In a networked deployment, the machine 1600 may operate in the capacity of a server machine or a client machine in a server-client network environment, or as a node in a peer-to-peer or distributed network environment. Machine 1600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1600 is illustrated, the term "machine" include a collection of machines that individually or jointly execute the instructions 1616.

The machine 1600 may include processors 1610, memory 1630, and I/O components 1650, which may be communicatively coupled via, for example, a bus 1602. The bus 1602 may include multiple buses coupling various elements of machine 1600 via various bus technologies and protocols. In an example, the processors 1610 (including, for example, a central processing unit (CPU), a graphics processing unit (GPU), a digital signal processor (DSP), an ASIC, or a suitable combination thereof) may include one or more processors 1612a to 1612n that may execute the instructions 1616 and process data. In some examples, one or more processors 1610 may execute instructions provided or identified by one or more other processors 1610. The term "processor" includes a multi-core processor including cores that may execute instructions contemporaneously. Although FIG. 16 shows multiple processors, the machine 1600 may include a single processor with a single core, a single processor with multiple cores (for example, a multi-core processor), multiple processors each with a single core, multiple processors each with multiple cores, or any combination thereof. In some examples, the machine 1600 may include multiple processors distributed among multiple machines.

The memory/storage 1630 may include a main memory 1632, a static memory 1634, or other memory, and a storage unit 1636, both accessible to the processors 1610 such as via the bus 1602. The storage unit 1636 and memory 1632, 1634 store instructions 1616 embodying any one or more of the functions described herein. The memory/storage 1630 may also store temporary, intermediate, and/or long-term data for processors 1610. The instructions 1616 may also reside, completely or partially, within the memory 1632, 1634, within the storage unit 1636, within at least one of the processors 1610 (for example, within a command buffer or cache memory), within memory at least one of I/O components 1650, or any suitable combination thereof, during execution thereof. Accordingly, the memory 1632, 1634, the storage unit 1636, memory in processors 1610, and memory in I/O components 1650 are examples of machine-readable media.

As used herein, "machine-readable medium" refers to a device able to temporarily or permanently store instructions and data that cause machine 1600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1616) for execution by a machine 1600 such that the instructions, when executed by one or more processors 1610 of the machine 1600, cause the machine 1600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1650 may include a wide variety of hardware components adapted to receive input, provide output, produce output, transmit information, exchange information, capture measurements, and so on. The specific I/O components 1650 included in a particular machine will depend on the type and/or function of the machine. For example, mobile devices such as mobile phones may include a touch input device, whereas a headless server or IoT device may not include such a touch input device. The particular examples of I/O components illustrated in FIG. 16 are in no way limiting, and other types of components may be included in machine 1600. The grouping of I/O components 1650 are merely for simplifying this discussion, and the grouping is in no way limiting. In various examples, the I/O components 1650 may include user output components 1652 and user input components 1654. User output components 1652 may include, for example, display components for displaying information (for example, a liquid crystal display (LCD) or a projector), acoustic components (for example, speakers), haptic components (for example, a vibratory motor or force-feedback device), and/or other signal generators. User input components 1654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1650 may include biometric components 1656 and/or position components 1662, among a wide array of other environmental sensor components. The biometric components 1656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1662 may include, for example, location sensors (for example, a Global Position System (GPS) receiver), altitude sensors (for example, an air pressure sensor from which altitude may be derived), and/or orientation sensors (for example, magnetometers).

The I/O components 1650 may include communication components 1664, implementing a wide variety of technologies operable to couple the machine 1600 to network(s) 1670 and/or device(s) 1680 via respective communicative couplings 1672 and 1682. The communication components 1664 may include one or more network interface components or other suitable devices to interface with the network(s) 1670. The communication components 1664 may include, for example, components adapted to provide wired communication, wireless communication, cellular communication, Near Field Communication (NFC), Bluetooth communication, Wi-Fi, and/or communication via other modalities. The device(s) 1680 may include other machines or various peripheral devices (for example, coupled via USB).

In some examples, the communication components 1664 may detect identifiers or include components adapted to detect identifiers. For example, the communication components 1664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1662, such as, but not limited to, geo-location via Internet Protocol (IP) address, location via Wi-Fi, cellular, NFC, Bluetooth, or other wireless station identification and/or signal triangulation.

Furthermore, implementations of the present disclosure can make use of any of the features, systems, components, devices, and methods described in U.S. Patent Publication Number 20170257459 to Vaidyanathan et al., published Sep. 7, 2017 and titled "Cross-application service-driven contextual messages," the disclosure of which is herein incorporated by reference in its entirety. Other implementations may make use of the features, systems, components, devices, and methods described in U.S. Patent Publication Number 2018/0052696 to Riscutia et al., published Feb. 22, 2018, and titled "Providing Teacher User Interface Activated By User Interaction", U.S. Patent Publication Number 2016/0132234 to Riscutia et al., published May 12, 2016, and titled "User interface for application command control", U.S. patent application Ser. No. 15/694,395 to Navarro et al., filed Sep. 1, 2017, and titled "Service-Driven Dynamic User Interface Technology," and U.S. patent application Ser. No. 15/248,104 to Navarro et al., filed Aug. 26, 2016, and titled "Data Driven Feature Discovery," each of these applications being herein incorporated by reference in their entirety.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An assistive device comprising:
   a camera including one or more outward facing image sensors configured to capture first image data for a first object included in a physical space observed by the camera;
   one or more processors; and
   one or more non-transitory computer readable media including instructions which, when executed by the one or more processors, cause the one or more processors to:
      automatically classify the first object as being associated with a first object classification based on the captured first image data, wherein the first object is classified as a person in the physical space;
      automatically determine a first pose of the person represented by the first object using a first machine learning model trained to determine the first pose of the person based on depth data included in the first image data;
      automatically identify a first audio signal representative of the first pose of the person represented by the first object using a second machine learning model trained to identify a first action associated with the first pose and to identify the first audio signal associated with the first action;
      and
      emit the first audio signal through a speaker included in the assistive device.

2. The assistive device of claim 1, wherein the instructions further cause the one or more processors to:
   automatically determine a first position in the physical space for the first object relative to the assistive device based on the first image data; and
   automatically identify the first audio signal based in part on the determined first position of the first object.

3. The assistive device of claim 2, wherein the instructions further cause the one or more processors to:
   capture second image data for the first object while the first object moves through the physical space over a first period of time;
   automatically determine a second position in the physical space for the first object relative to the assistive device based on the second image data;
   automatically identify a second audio signal based on the first object being associated with both the first object classification and the second position of the first object; and
   emit the second audio signal through the speaker.

4. The assistive device of claim 3, wherein the instructions further cause the one or more processors to:
   automatically determine updated positions for the first object relative to the assistive device based on the second image data; and
   repeatedly emit audio signals through the speaker based on the updated positions for the first object, so as to provide a real-time auditory sensory substitution transmission for the first object.

5. The assistive device of claim 4, wherein the instructions further cause the one or more processors to increase a frequency of the auditory transmission as the first object approaches the assistive device.

6. The assistive device of claim 1, wherein the instructions further cause the one or more processors to:
   capture second image data for the first object while the first object changes pose from the first pose to at least one updated pose over a first period of time;
   automatically determine the at least one updated pose for the first object based on the second image data using the first machine learning model and depth data included in the second image data; and
   repeatedly emit audio signals through the speaker based on the updated poses for the first object, so as to provide a real-time auditory sensory substitution transmission for the first object.

7. The assistive device of claim 1, wherein the instructions further cause the one or more processors to:
   automatically identify a first portion of the first object based on the first image data;
   automatically classify the first portion as being associated with a first facial expression classification based on the first image data;
   automatically identify a second audio signal based at least on the first object being associated with the first facial expression classification; and
   emit the second audio signal through the speaker.

8. The assistive device of claim 1, wherein the instructions further cause the one or more processors to:

automatically classify a plurality of objects included in the physical space as being associated with respective object classifications, based on second image data captured by the camera;
automatically identify a plurality of audio signals based at least on the plurality of objects being associated with their respective object classifications; and
emit the plurality of audio signals through the speaker.

9. The assistive device of claim 1, wherein the instructions further cause the one or more processors to:
capture second image data for a second object included in the physical space observed by the camera;
automatically classify the second object as being associated with a first command classification based on the second image data;
automatically identify a second audio signal based at least on the second object being associated with both the first command classification; and
emit the second audio signal through the speaker.

10. A method executed on an assistive device to present audio signals corresponding to objects captured in a field of view of a camera, the method comprising:
capturing first image data for a first object included in a physical space observed by the camera;
automatically classifying the first object as being associated with a first object classification based on the captured first image data, wherein the first object is classified as a person in the physical space;
automatically determining a first pose of the person represented by the first object using a first machine learning model trained to determine the first pose of the person based on depth data included in the first image data;
automatically identifying a first audio signal representative of the first pose of the person represented by the first object using a second machine learning model trained to identify a first action associated with the first pose and to identify the first audio signal associated with the first action; and
emitting the first audio signal and the second audio signal through a speaker included in the assistive device.

11. The method of claim 10, further comprising:
automatically determining a first position in the physical space for the first object relative to the assistive device based on the first image data; and
automatically identifying the first audio signal based in part on the determined first position of the first object.

12. The method of claim 11, further comprising:
capturing second image data for the first object while the first object moves through the physical space over a first period of time;
automatically determining a second position in the physical space for the first object relative to the assistive device based on the second image data;
automatically identifying a second audio signal based on the first object being associated with the first object classification and the second position of the first object; and
emitting the second audio signal through the speaker.

13. The method of claim 12, further comprising:
automatically determining updated positions for the first object relative to the assistive device based on the second image data; and
repeatedly emitting audio signals through the speaker based on the updated positions for the first object, so as to provide a real-time auditory sensory substitution transmission for the first object.

14. The method of claim 13, further comprising increasing a frequency of the auditory transmission as the first object approaches the assistive device.

15. The method of claim 14, further comprising decreasing a frequency of the auditory transmission as the first object moves further away from the assistive device.

16. A machine readable medium including instructions which, when executed by one or more processors included in the assistive device, cause the assistive device to perform the method of claim 11.

17. The method of claim 10, further comprising:
capturing second image data for the first object while the first object changes pose from the first pose to at least one updated pose over a first period of time;
automatically determining the at least one updated pose for the first object based on the second image data using the first machine learning model and depth data included in the second image data; and
repeatedly emitting audio signals through the speaker based on the updated poses for the first object, so as to provide a real-time auditory sensory substitution transmission for the first object.

18. The method of claim 10, further comprising:
automatically identifying a first portion of the first object based on the first image data;
automatically classifying the first portion as being associated with a first facial expression classification based on the first image data;
automatically identifying a second audio signal based at least on the first object being associated with the first facial expression classification; and
emitting the second audio signal through the speaker.

19. The method of claim 10, further comprising:
automatically classifying a plurality of objects included in the physical space as being associated with respective object classifications, based on second image data captured by the camera;
automatically identifying a plurality of audio signals based at least on the plurality of objects being associated with their respective object classifications; and
emitting the plurality of audio signals through the speaker.

20. The method of claim 10, further comprising:
capturing second image data for a second object included in the physical space observed by the camera;
automatically classifying the second object as being associated with a first command classification based on the second image data;
automatically identifying a second audio signal based at least on the second object being associated with the first command classification; and
emitting the second audio signal through the speaker.

* * * * *